United States Patent [19]

Okazaki et al.

[11] Patent Number: 5,432,807
[45] Date of Patent: Jul. 11, 1995

[54] OPTICAL WAVELENGTH CONVERTING APPARATUS

[75] Inventors: Yoji Okazaki; Chiaki Goto; Hiroaki Hyuga; Akinori Harada, all of Kanagawa, Japan

[73] Assignee: Fuji Photo Film Co., Ltd., Kanagawa, Japan

[21] Appl. No.: 208,139

[22] Filed: Mar. 9, 1994

Related U.S. Application Data

[62] Division of Ser. No. 843,719, Feb. 28, 1992, Pat. No. 5,315,433.

[30] Foreign Application Priority Data

| Feb. 28, 1991 | [JP] | Japan | 3-33954 |
|---|---|---|---|
| Mar. 1, 1991 | [JP] | Japan | 3-36098 |
| Apr. 12, 1991 | [JP] | Japan | 3-79849 |
| Apr. 15, 1991 | [JP] | Japan | 3-82333 |
| Apr. 17, 1991 | [JP] | Japan | 3-85322 |
| Apr. 17, 1991 | [JP] | Japan | 3-85595 |
| Apr. 18, 1991 | [JP] | Japan | 3-86404 |
| Apr. 18, 1991 | [JP] | Japan | 3-86617 |

[51] Int. Cl.6 .................................................. M01S 3/10
[52] U.S. Cl. .................................. 372/22; 359/328; 372/98; 372/105
[58] Field of Search ............ 372/20, 21, 22, 75, 372/92, 98, 105; 359/328

[56] References Cited

U.S. PATENT DOCUMENTS 5,206,867  4/1993  Esterowitz et al. ............ 372/105

Primary Examiner—James W. Davie
Attorney, Agent, or Firm—Sughrue, Mion, Zinn, Macpeak & Seas

[57] ABSTRACT

In an optical wavelength converting apparatus, a fundamental wave impinges upon a crystal of a nonlinear optical material, the type II of phase matching between the fundamental wave and its second harmonic is effected, and the second harmonic of the fundamental wave is thereby radiated out of the optical wavelength converting apparatus. Two crystals constituted of the same material are employed as the crystal. The two crystals have equal lengths and are located in orientations such that corresponding optic axes may be shifted 90° from each other. The optical wavelength converting apparatus yields the second harmonic having the maximum possible output power and yet can be kept small in size and low in cost.

7 Claims, 15 Drawing Sheets

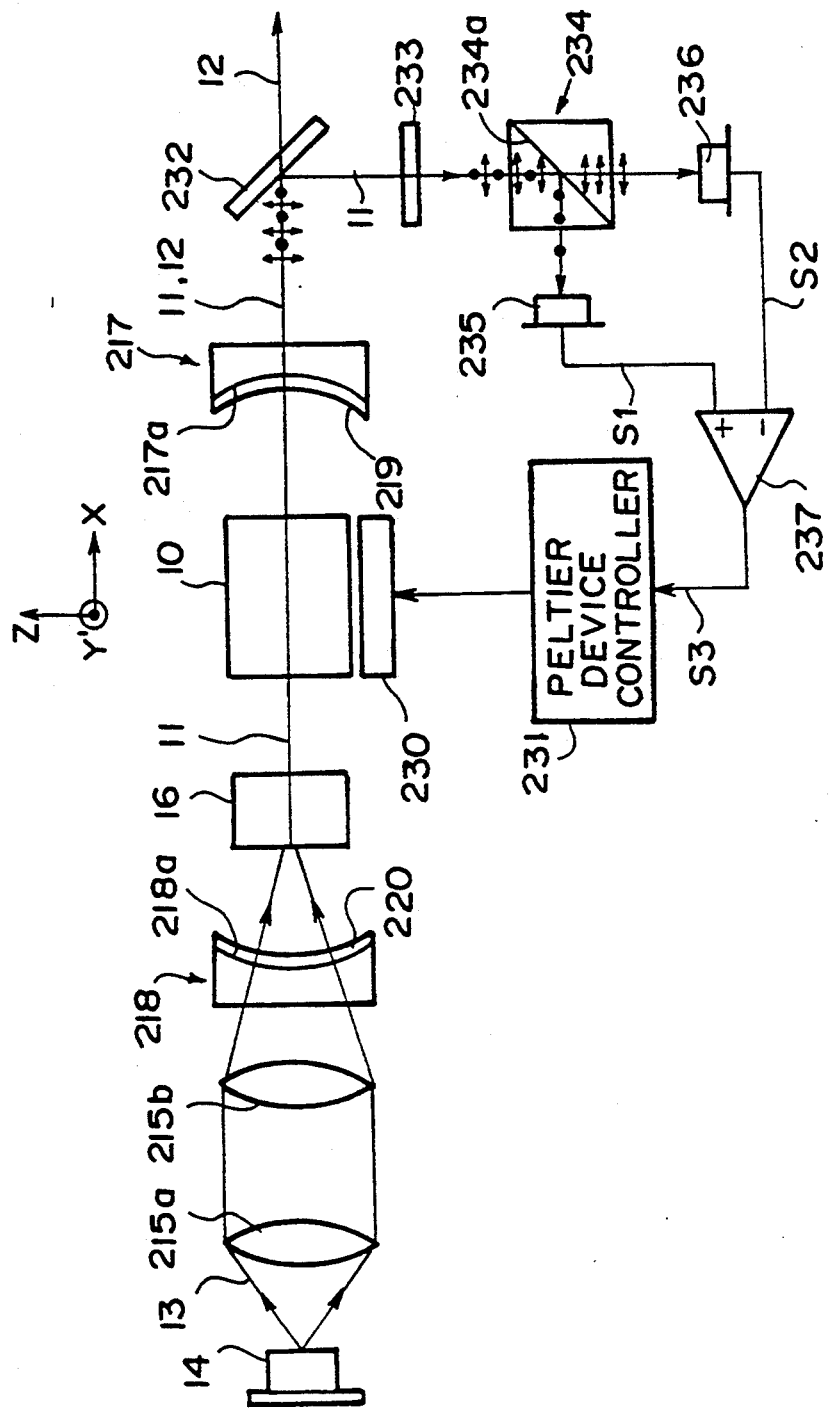

F I G. 30
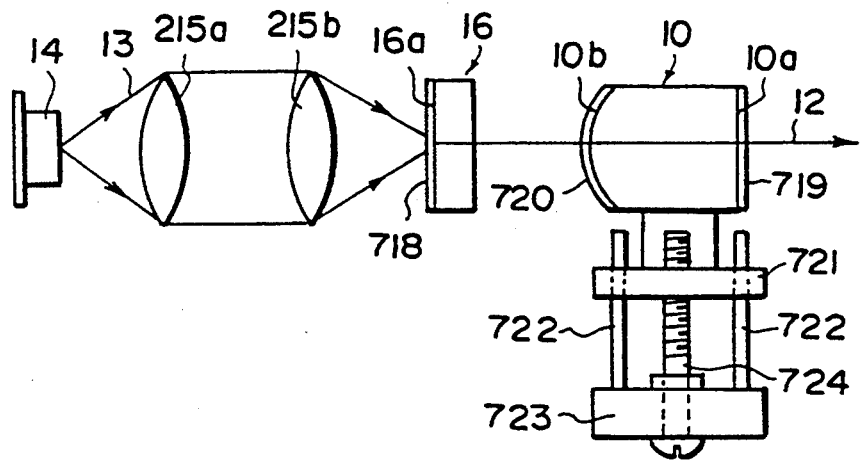
F I G. 31
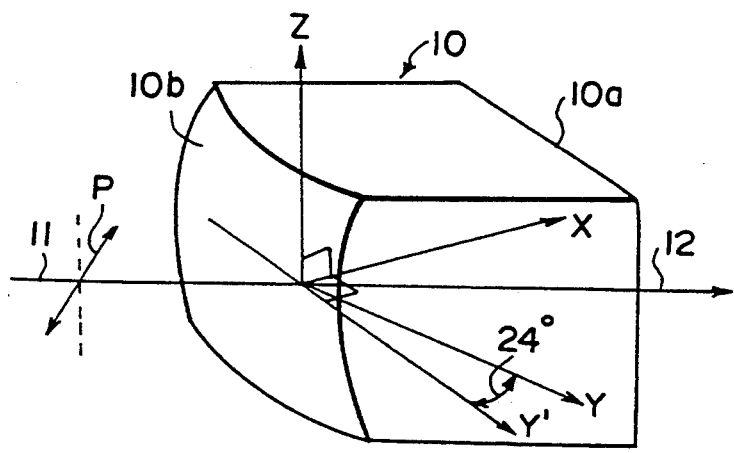
F I G. 32
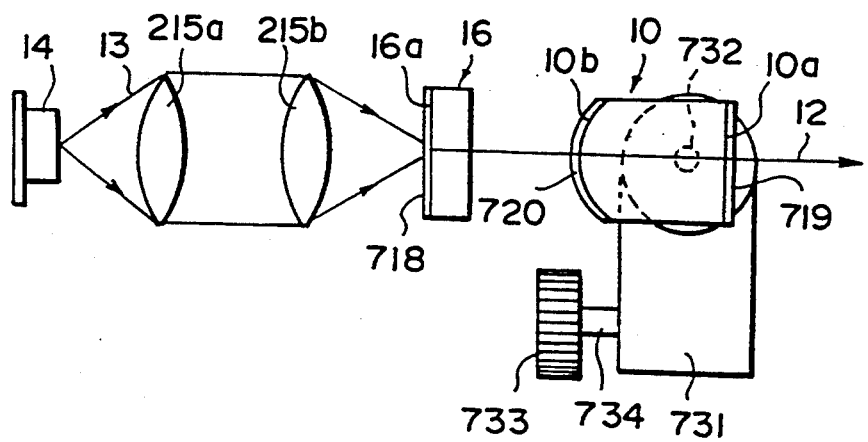

OPTICAL WAVELENGTH CONVERTING APPARATUS

This is a divisional of application Ser. No. 07/843,719, filed Feb. 28, 1992, U.S. Pat. No. 5,315,433.

BACKGROUND OF THE INVENTION

1. Field of the Invention

This invention relates to an optical wavelength converting apparatus for converting a fundamental wave into its second harmonic. This invention particularly relates to an optical wavelength converting apparatus, wherein a crystal of a nonlinear optical material, with which the type II of phase matching between a fundamental wave and its second harmonic is effected, is utilized.

2. Description of the Prior Art

Various attempts have heretofore been made to convert the fundamental wave of a laser beam into its second harmonic, e.g. to shorten the wavelength of a laser beam, by using a nonlinear optical material. As an optical wavelength converting apparatus for carrying out such wavelength conversion, there has heretofore been known a bulk crystal type of optical wavelength converting apparatus as described in, for example, "Hikari Electronics No Kiso" (Fundamentals of Optoelectronics) by A. Yariv, translated by Kunio Tada and Takeshi Kamiya, Maruzen K.K., pp. 200–204.

Also, laser diode pumped solid lasers have been proposed in, for example, Japanese Unexamined Patent Publication No. 62(1987)-189783. The proposed laser diode pumped solid lasers comprise a solid laser rod, which has been doped with a rare earth metal, such as neodymium (Nd). The solid laser rod is pumped by a semiconductor laser (a laser diode). In the laser diode pumped solid laser of this type, in order for a laser beam having as short a wavelength as possible to be obtained, a bulk single crystal of a nonlinear optical material for converting the wavelength of a laser beam, which has been produced by solid laser oscillation, is located in a resonator of the solid laser. The laser beam, which has been produced by the solid laser oscillation, is thereby converted into its second harmonic, or the like.

As the crystal of the nonlinear optical material, a biaxial crystal, such as a KTP crystal, is often employed. How to effect the phase matching with a KTP biaxial crystal is described in detail by Yao, et al. in J. Appl. Phys., Vol. 55, p. 65, 1984. The method for effecting the phase matching with a biaxial crystal will be described hereinbelow.

With reference to FIG. 4, the direction, along which a fundamental wave travels, and the optic axis Z of the crystal make an angle $\theta$. The projection of the direction, along which the fundamental wave travels onto the plane in which the optic axes X and Y lie, and the optic axis X make an angle $\phi$. The refractive index of the crystal with respect to the fundamental wave, which impinges upon the crystal at an arbitrary angle of incidence, and the refractive index of the crystal with respect to the second harmonic of the fundamental wave are represented respectively by $$n\omega, n^{2\omega} \tag{1}$$

The refractive indexes of the crystal with respect to the light components of the fundamental wave, which have been polarized respectively in the X, Y, and Z optic axis directions, and the refractive indexes of the crystal with respect to the light components of the second harmonic, which have been polarized respectively in the X, Y, and Z optic axis directions, are represented by $$n_X^\omega, n_Y^\omega, n_Z^\omega, n_X^{2\omega}, n_Y^{2\omega}, n_Z^{2\omega} \tag{2}$$

When $k_X$, $k_Y$, and $k_Z$, are defined as follows:
$k_X = \sin\theta \cdot \cos\phi$
$k_Y = \sin\theta \cdot \sin\phi$
$k_Z = \cos\theta$
the following formulas obtain:

$$\frac{k_X^2}{(n^\omega)^{-2} - (n_X^\omega)^{-2}} + \frac{k_Y^2}{(n^\omega)^{-2} - (n_Y^\omega)^{-2}} + \frac{k_Z^2}{(n^\omega)^{-2} - (n_Z^\omega)^{-2}} = 0 \tag{3}$$

$$\frac{k_X^2}{(n^{2\omega})^{-2} - (n_X^{2\omega})^{-2}} + \frac{k_Y^2}{(n^{2\omega})^{-2} - (n_Y^{2\omega})^{-2}} + \frac{k_Z^2}{(n^{2\omega})^{-2} - (n_Z^{2\omega})^{-2}} = 0 \tag{4}$$

Solutions of Formulas (3) and (4) represent the conditions under which the phase matching can be effected.

When B1, C1, B2, and C2 are defined as follows:

$$\begin{aligned}
B_1 &= -k_X^2(b_1 + c_1) - k_Y^2(a_1 + c_1) - k_Z^2(a_1 + b_1) \\
C_1 &= k_X^2 b_1 c_1 + k_Y^2 a_1 c_1 + k_Z^2 a_1 b_1 \\
B_2 &= -k_X^2(b_2 + c_2) - k_Y^2(a_2 + c_2) - k_Z^2(a_2 + b_2) \\
C_2 &= k_X^2 b_2 c_2 + k_Y^2 a_2 c_2 + k_Z^2 a_2 b_2
\end{aligned} \tag{5}$$

$$a_1 = (n_X^\omega)^{-2} \quad a_2 = (n_X^{2\omega})^{-2}$$
$$b_1 = (n_Y^\omega)^{-2} \quad b_2 = (n_Y^{2\omega})^{-2}$$
$$c_1 = (n_Z^\omega)^{-2} \quad c_2 = (n_Z^{2\omega})^{-2}$$

the solutions of Formulas (3) and (4) are represented by the formulas $$n^{\omega,i} = \frac{\sqrt{2}}{\sqrt{-B_1 \pm \sqrt{B_1^2 - 4C_1}}} \tag{6}$$

$$n^{2\omega,i} = \frac{\sqrt{2}}{\sqrt{-B_2 \pm \sqrt{B_2^2 - 4C_2}}} \tag{7}$$

(Double signs: $+$ when $i=1$, and $-$ when $i=2$)

When the condition $$n^{\omega,2} n^{2\omega,1} \tag{8}$$

is satisfied, the phase matching between the fundamental wave and its second harmonic is effected. Such phase matching is referred to as the type I of phase matching.

Also, when the condition $$\tfrac{1}{2}(n^{\omega,1} + n^{\omega,2}) = n^{2\omega,1} \tag{9}$$

is satisfied, the phase matching between the fundamental wave and its second harmonic is effected. Such phase matching is referred to as the type II of phase matching.

In cases where the type II of phase matching is effected with a biaxial crystal, the fundamental wave impinging upon the crystal is subjected to two refractive indexes of the crystal. By way of example, the nonlinear optical constant d24 of the crystal may be utilized. Specifically, as illustrated in FIG. 5, a fundamental wave 11, which has been polarized linearly in the direction indicated by the double headed arrow P, may be introduced into a crystal 10. The direction indicated by the double headed arrow P inclines at an angle of 45° from the Y optic axis of the crystal 10 towards the Z axis of the crystal 10. (The fundamental wave 11 comprises the linearly polarized light component in the Y axis direction and the linearly polarized light component in the Z axis direction.) In this manner, a second harmonic 12, which has been polarized linearly in the Y axis direction, may be obtained from the crystal 10. In such cases, the linearly polarized light component of the fundamental wave 11 in the Z axis direction is subjected to a refractive index $$n^{\omega}{}_{,1} \tag{10}$$

Also, the linearly polarized light component of the fundamental wave 11 in the Y' direction, which direction is normal to the direction of travel of the fundamental wave 11 and to the Z axis, is subjected to a refractive index $$n^{\omega}{}_{,2} \tag{11}$$

Thus the fundamental wave 11 is subjected to the two refractive indexes.

Strictly speaking, in cases where the crystal 10 has been cut into the shape shown in FIG. 5, the fundamental wave 11 impinges upon the crystal 10 such that it has been polarized linearly in the Y' direction (which inclines from the Y axis towards the X axis) and in the Z axis direction. The second harmonic 12 is obtained as light which has been polarized in the Y' direction. However, practically, no problem occurs when consideration is made in the manner described above.

As described above, in cases where the type II of phase matching is to be effected with a biaxial crystal, a fundamental wave, which has been polarized linearly in one direction, has heretofore impinged upon a nonlinear optical material such that polarized light components may occur in directions along which the two crystallographic axes of the nonlinear optical material extend. Therefore, the fundamental wave has heretofore been subjected to two refractive indexes. If the fundamental wave is subjected to two refractive indexes, a phase difference Δ will occur between the polarized light components, which are subjected to different refractive indexes. The phase difference Δ is represented by the formula $$\Delta = (n^{\omega}{}_{,2} - n^{\omega}{}_{,1})L \cdot 2\pi/\lambda \tag{12}$$

where λ represents the wavelength of the fundamental wave, and L represents the length of the crystal. The length, L, of the crystal is the effective length, i.e., the length of the optical path of the fundamental wave in the crystal.

If the phase difference Δ occurs, the direction of linear polarization of the fundamental wave will change in accordance with the value of the phase difference Δ.

If the direction of linear polarization of the fundamental wave thus changes, the angles of the direction of linear polarization of the fundamental wave, with respect to the optic axes of the crystal of the nonlinear optical material, will shift from the predetermined values of the angles, at which the maximum possible efficiency of wavelength conversion can be achieved. As a result, the output power of the second harmonic becomes low. Such fluctuations in the output power of the second harmonic occur periodically. The fluctuations in the output power of the second harmonic are classified into those which are dependent on the temperature and which occur in the pattern shown in FIG. 6, in accordance with the dependency of the parameters in Formula (12) upon the temperature, and those which are dependent on the length of the crystal and which occur in the pattern shown in FIG. 7.

Therefore, in order for the second harmonic having the maximum possible output power to be obtained, it is necessary that the temperature of the crystal or the length of the crystal be set to appropriate values. An example of an optical wavelength converting apparatus, in which the temperature of a crystal is adjusted, is disclosed in, for example, U.S. Pat. No. 4,913,533. Also, examples of optical wavelength converting apparatuses, in which the length of a crystal is adjusted, are disclosed in, for example, Japanese Unexamined Patent Publication Nos. 1(1989)-152781 and 1(1989)-152782.

Also, in Japanese Unexamined Patent Publication No. 1(1989)-152781, an optical wavelength converting apparatus is disclosed in which a crystal of a nonlinear optical material having a trapezoidal cross-sectional shape is located in a resonator. The crystal is moved up and down with respect to the trapezoid, and the length of the optical path of the fundamental wave in the crystal is thereby changed. In this manner, the phase difference Δ is adjusted.

However, in cases where the length of the crystal is kept the same, and the temperature of the crystal is adjusted such that the second harmonic having the maximum possible output power may be obtained, a large electric power source for the adjustment of the temperature and a large heat sink must be employed such that the temperature of the crystal may be adjusted to a value falling within a wide range. Therefore, the size of the optical wavelength converting apparatus cannot be kept small in size, and the cost of the optical wavelength converting apparatus cannot be kept low.

Also, ordinarily, in cases where the temperature of the crystal is adjusted to a predetermined appropriate value, it inevitably occurs that the position, at which the temperature of the crystal is monitored, (or the position at which the temperature in the resonator is monitored) and the part of the crystal, through which the fundamental wave actually passes, are spaced apart from each other. Therefore, if the temperature in the optical wavelength converting apparatus is changed by a change in the ambient temperature, or the like, the detected temperature will not coincide with the temperature of the part of the crystal, through which the fundamental wave passes. As a result, the temperature of the part of the crystal through which the fundamental wave passes will be adjusted to a value different from the desired value. Accordingly, the second harmonic having the maximum possible output power cannot be obtained.

In cases where the temperature of the crystal is kept the same, and the length of the crystal is adjusted to a value appropriate for the temperature of the crystal, the length of the crystal must be adjusted very strictly. Therefore, it is difficult for the second harmonic having the maximum possible output power to be obtained. Even if it is possible for the second harmonic having the maximum possible output power to be obtained, because the length of the crystal must be measured and adjusted strictly, the cost of the optical wavelength converting apparatus cannot be kept low.

With the optical wavelength converting apparatus disclosed in Japanese Unexamined Patent Publication No. 1(1989)-152781, it is necessary for the crystal of the nonlinear optical material to be moved a comparatively large distance. Therefore, if the direction of linear polarization of the fundamental wave is adjusted, the position of the resonator mode will shift from the correct position. Also, with the optical wavelength converting apparatus disclosed in Japanese Unexamined Patent Publication No. 1(1989)-152781, the fundamental wave easily undergoes the longitudinal multimode. As a result, the problem occurs in that mode competition noise occurs easily.

SUMMARY OF THE INVENTION

The primary object of the present invention is to provide an optical wavelength converting apparatus, wherein a crystal of a nonlinear optical material, with which the type II of phase matching between a fundamental wave and its second harmonic is effected, is utilized such that the second harmonic having the maximum possible output power may be obtained and the optical wavelength converting apparatus may be small in size and low in cost.

Another object of the present invention is to provide an optical wavelength converting apparatus, with which the aforesaid primary object is accomplished, and the position of the resonator mode does not shift from the correct position.

The specific object of the present invention is to provide an optical wavelength converting apparatus, with which the aforesaid primary object is accomplished, and the second harmonic, having high output power and free of any mode competition noise, is obtained.

The present invention provides a first optical wavelength converting apparatus in which a fundamental wave impinges upon a crystal of a nonlinear optical material, the type II of phase matching between the fundamental wave and its second harmonic is effected, and the second harmonic of the fundamental wave is thereby radiated out of the optical wavelength converting apparatus, wherein two crystals constituted of the same material are employed as said crystal, the two said crystals having equal lengths and being located in orientations such that corresponding optic axes may be shifted 90° from each other.

With the first optical wavelength converting apparatus in accordance with the present invention, by way of example, the two crystals are located in orientations shown in FIG. 1. Specifically, a crystal 10 and a crystal 10', which have equal lengths L, are located such that, for example, the Z axes may be shifted 90° from each other. In such cases, a phase difference $\Delta$ with the crystal 10 is represented by the formula $$\Delta = (n^{107},_2 - n^{\omega},_1) L \cdot 2\pi/\lambda$$

Also, a phase difference $\Delta'$ with the crystal 10' is represented by the formula $$\Delta' = (n^{\omega},_1 - n^{\omega},_2) L \cdot 2\pi/\lambda$$

Therefore, the phase difference with the crystals 10 and 10' becomes zero (i.e. $\Delta + \Delta' = 0$).

Even if the length L of the crystal 10 and the length L of the crystal 10' are different slightly, the phase difference ($\Delta + \Delta'$) will be close to zero. Therefore, the period, with which fluctuations in the output power of the second harmonic due to temperature occur, becomes very long. Accordingly, even if the length L of the crystal 10 and the length L of the crystal 10' are different slightly, the second harmonic, having output power close to the maximum value, can be obtained.

As described above, the first optical wavelength converting apparatus in accordance with the present invention has a simple structure composed of two crystals of the nonlinear optical material and can yield the second harmonic having the maximum intensity. The first optical wavelength converting apparatus in accordance with the present invention need not be provided with a temperature adjusting means, which is large in size and should have a high accuracy. Therefore, the first optical wavelength converting apparatus in accordance with the present invention can be kept small in size and cheap in cost. Also, with the first optical wavelength converting apparatus in accordance with the present invention, the two crystals of the nonlinear optical material may be prepared such that their lengths are equal to each other. The lengths of the two crystals of the nonlinear optical material need not be set strictly at specific values. Therefore, accurate measurement and adjustment of the lengths of the crystals need not be carried out. With this feature, the cost of the first optical wavelength converting apparatus in accordance with the present invention can be lowered even further.

The present invention also provides a second optical wavelength converting apparatus in which a fundamental wave impinges upon a crystal of a nonlinear optical material, the type II of phase matching between the fundamental wave and its second harmonic is effected, and the second harmonic of the fundamental wave is thereby radiated out of the optical wavelength converting apparatus, wherein said crystal is composed of a crystal of a material, the refractive index of which changes with a stress, and a means applies a stress to said crystal.

In the second optical wavelength converting apparatus in accordance with the present invention, the means for applying a stress to the crystal should preferably apply the stress in a single optic axis direction, which intersects perpendicularly to the direction of incidence of the fundamental wave upon the crystal.

Effects of the application of a stress will be described hereinbelow by taking the configuration shown in FIG. 5 as an example. By way of example, a stress is applied to the crystal 10 only in the Z axis direction. When a stress is applied in the Z axis direction, the refractive index $$n^{\omega},_1$$

i.e. the refractive index to which the linearly polarized light component of the fundamental wave 11 in the Z axis direction is subjected, changes. As described above, the phase difference Δ with the crystal 10 is represented by the formula $$\Delta = (n^{\omega}{}_{,2} - n^{\omega}{}_{,1}) L \cdot 2\pi/\lambda$$

Therefore, by changing the refractive index $$n^{\omega}{}_{,1}$$

the phase difference Δ can be made equal to or approximately equal to $2n\pi$, where n represents an integer. If the phase difference Δ is close to $2n\pi$, the period, with which fluctuations in the output power of the second harmonic due to temperature occur, becomes very long. Accordingly, even if the phase difference Δ is not equal to $2n\pi$, but is close to $2n\pi$, the second harmonic, having output power close to the maximum value, can be obtained.

The means for applying a stress to the crystal may apply the stress in a direction shifted from the single optic axis direction, which intersects perpendicularly to the direction of incidence of the fundamental wave upon the crystal. Specifically, by way of example, in FIG. 5, the means for applying a stress to the crystal may apply a stress, which has a component in the Z axis direction and a component in the Y' axis direction. Even in such cases, a much larger stress can be applied in one optic axis direction than in the other optic axis direction, depending on the direction in which the stress is applied. Also, in cases where an equal stress is applied in the two optic axis directions, if the change characteristics of the refractive index $$n^{\omega}{}_{,1}$$

and the refractive index $$n^{\omega}{}_{,2}$$

with respect to the stress are different from each other, the phase difference Δ can be made equal to $2n\pi$, where n represents an integer.

Also, the means for applying a stress to the crystal may apply a positive stress or a negative stress. Alternatively, the means for applying a stress to the crystal may apply a positive stress in one direction and a negative stress in the other direction.

As described above, the second optical wavelength converting apparatus in accordance with the present invention has a simple structure composed of the means for applying a stress to the crystal of the nonlinear optical material and can yield the second harmonic having the maximum intensity. The second optical wavelength converting apparatus in accordance with the present invention need not be provided with a temperature adjusting means, which is large in size and should have a high accuracy. Therefore, the second optical wavelength converting apparatus in accordance with the present invention can be kept small in size and cheap in cost. Also, with the second optical wavelength converting apparatus in accordance with the present invention, the length of the crystal of the nonlinear optical material need not be set strictly at a specific value. Therefore, accurate measurement and adjustment of the length of the crystal need not be carried out. With this feature, the cost of the second optical wavelength converting apparatus in accordance with the present invention can be lowered even further.

The present invention further provides a third optical wavelength converting apparatus in which a fundamental wave impinges upon a crystal of a nonlinear optical material, the type II of phase matching between the fundamental wave and its second harmonic is effected, and the second harmonic of the fundamental wave is thereby radiated out of the optical wavelength converting apparatus, wherein the improvement comprises the provision of:
i) a means for adjusting a difference in phase of said fundamental wave due to said crystal,
ii) a means for separating said fundamental wave into two polarized light components, which intersect perpendicularly to each other,
iii) a means for detecting the light intensity of one of said polarized light components, which have been separated from each other,
iv) a means for detecting the light intensity of the other of said polarized light components, which have been separated from each other, and
v) a control means for controlling said means for adjusting a difference in phase such that a predetermined relationship may be kept between the light intensities of the two polarized light components, which light intensities are detected by two said detection means.

As the means for adjusting a difference in phase, by way of example, a means for adjusting the temperature of the crystal of the nonlinear optical material, a means for applying a voltage to the crystal, or a means for applying a stress to the crystal may be employed. Alternatively, as the means for adjusting a difference in phase, a combination of a phase compensating device, which is inserted into the optical path of the fundamental wave, and a means for changing the position, the orientation, or the like, of the phase compensating device may be employed.

Effects of the third optical wavelength converting apparatus in accordance with the present invention will be described hereinbelow with reference to, for example, FIG. 5. If the direction of linear polarization of the fundamental wave 11 makes an angle of 45° with respect to the Z axis, the second harmonic 12 having the maximum intensity can be obtained. Therefore, the fundamental wave 11 is separated into the linearly polarized light component in the Z axis direction and the linearly polarized light component in the Y' axis direction. The means for adjusting a difference in phase is then controlled such that the light intensity of the linearly polarized light component in the Z axis direction and the light intensity of the linearly polarized light component in the Y' axis direction may become equal to each other. As a result, the direction of linear polarization of the fundamental wave 11 makes an angle of 45° with respect to the Z axis. Therefore, the second harmonic 12, having the maximum intensity, can be obtained.

As described above, with the third optical wavelength converting apparatus in accordance with the present invention, the actual direction of linear polarization of the fundamental wave is detected, and the means for adjusting a difference in phase is controlled such that the direction of linear polarization of the fundamental wave may coincide with a predetermined direction. Therefore, no problem due to an error in the monitored temperature occurs, and the second harmonic, having the maximum intensity, can be obtained reliably.

Also, with the third optical wavelength converting apparatus in accordance with the present invention, accurate measurement and adjustment of the length of the crystal need not be carried out. Therefore, the cost of the third optical wavelength converting apparatus in accordance with the present invention can be kept low.

The present invention still further provides a fourth optical wavelength converting apparatus in which a fundamental wave impinges upon a crystal of a nonlinear optical material, the type II of phase matching between the fundamental wave and its second harmonic is effected, and the second harmonic of the fundamental wave is thereby radiated out of the optical wavelength converting apparatus, wherein the improvement comprises the provision of a means for rotating said crystal around an axis, which extends in a direction that intersects an optical path of said fundamental wave in said crystal, and thereby changing the length of the optical path of said fundamental wave in said crystal.

The length of the optical path of the fundamental wave in the crystal corresponds to the crystal length L in Formula (12). If the crystal length L changes, the phase difference $\Delta$ will change. When the phase difference $\Delta$ changes, the direction of linear polarization of the fundamental wave also changes. Therefore, by rotating the crystal of the nonlinear optical material in the manner described above, the direction of linear polarization of the fundamental wave can be adjusted such that the maximum wavelength conversion efficiency may be obtained.

As described above, the fourth optical wavelength converting apparatus in accordance with the present invention has a simple structure composed of the means for rotating the crystal of the nonlinear optical material and can yield the second harmonic having the maximum intensity. The fourth optical wavelength converting apparatus in accordance with the present invention need not be provided with a temperature adjusting means, which is large in size and should have a high accuracy. Therefore, the fourth optical wavelength converting apparatus in accordance with the present invention can be kept small in size and cheap in cost. Also, with the fourth optical wavelength converting apparatus in accordance with the present invention, the length of the crystal of the nonlinear optical material need not be set strictly at a specific value. Therefore, accurate measurement and adjustment of the length of the crystal need not be carried out. With this feature, the cost of the fourth optical wavelength converting apparatus in accordance with the present invention can be lowered even further.

Also, with the fourth optical wavelength converting apparatus in accordance with the present invention, by selecting an appropriate angle of rotation of the crystal of the nonlinear optical material, the occurrence of any mode competition noise can be eliminated even if the fundamental wave is being generated in a multimode.

The present invention also provides a fifth optical wavelength converting apparatus in which a laser beam, serving as a fundamental wave and having been obtained by pumping a solid laser medium, impinges upon a crystal of a nonlinear optical material, the type II of phase matching between the fundamental wave and its second harmonic is effected, and the second harmonic of the fundamental wave is thereby radiated out of the optical wavelength converting apparatus, wherein two solid laser media, which produce linearly polarized laser beams, are employed as said solid laser medium, one of two said solid laser media is located such that the direction of linear polarization of the laser beam, which has been produced by said one solid laser medium, may coincide with the direction of one of two optic axes of said crystal, and the other solid laser medium is located such that the direction of linear polarization of the laser beam, which has been produced by said other solid laser medium, may coincide with the direction of the other optic axis of said crystal.

Effects of the fifth optical wavelength converting apparatus in accordance with the present invention will be described hereinbelow with reference to, for example, FIG. 5. In order for the second harmonic 12 to be produced, it is necessary that the fundamental wave 11 has the linearly polarized light component in the Z axis direction and the linearly polarized light component in the Y' axis direction. Therefore, in the fifth optical wavelength converting apparatus in accordance with the present invention, the two solid laser media are located such that the directions of linear polarization of the laser beams, which have been produced by the two solid laser media coincide with the Z axis direction and the Y' axis direction. The two laser beams, serving as the fundamental wave, impinge upon the crystal of the nonlinear optical material. In this manner, the fundamental wave is converted into its second harmonic.

One of the two laser beams is subjected only to one of the two refractive indexes represented by Formulas (10) and (11). The other laser beam is subjected only to the other of the two refractive indexes represented by Formulas (10) and (11). Therefore, even if the aforesaid phase difference $\Delta$ occurs, the direction of linear polarization of the fundamental wave will not fluctuate in accordance with the value of the phase difference $\Delta$.

As described above, the fifth optical wavelength converting apparatus in accordance with the present invention has a simple structure composed of the two solid laser media and can yield the second harmonic, having the maximum intensity, by preventing any phase difference from occurring in the fundamental wave. The fifth optical wavelength converting apparatus in accordance with the present invention need not be provided with a temperature adjusting means, which is large in size and should have a high accuracy. Therefore, the fifth optical wavelength converting apparatus in accordance with the present invention can be kept small in size and cheap in cost. Also, with the fifth optical wavelength converting apparatus in accordance with the present invention, the length of the crystal of the nonlinear optical material need not be set strictly at a specific value. Therefore, accurate measurement and adjustment of the length of the crystal need not be carried out. With this feature, the cost of the fifth optical wavelength converting apparatus in accordance with the present invention can be lowered even further.

The present invention further provides a sixth optical wavelength converting apparatus in which a laser beam, serving as a fundamental wave and having been obtained by pumping a solid laser medium, impinges upon a crystal of a nonlinear optical material, the type II of phase matching between the fundamental wave and its second harmonic is effected, and the second harmonic of the fundamental wave is thereby radiated out of the optical wavelength converting apparatus, wherein a solid laser medium, which exhibits birefringence and the thickness of which changes gradually along the direction that intersects the optical path of said fundamental wave in the solid laser medium, is employed as said solid laser medium, and a means which moves said solid laser medium, with respect to a pumping source, along said direction that intersects the optical path of said fundamental wave.

In cases where the solid laser medium, which exhibits birefringence, is employed, a phase difference $\Delta'$ occurs in the solid laser medium in the same manner as the phase difference $\Delta$, which is represented by Formula (12) and which occurs in the crystal of the nonlinear optical material. At this time, the solid laser medium, the thickness of which changes gradually along the direction that intersects the optical path of the fundamental wave in the solid laser medium, is moved with respect to the pumping source along the direction that intersects the optical path of the fundamental wave. As a result, the effective length of the optical path in the solid laser medium changes. Therefore, the phase difference $\Delta'$ changes, and the direction of linear polarization of the fundamental wave changes in accordance with the change in the phase difference $\Delta'$. Accordingly, by appropriately adjusting the distance of the movement of the solid laser medium, the direction of linear polarization of the fundamental wave, with respect to the crystal of the nonlinear optical material, can be set such that the maximum wavelength conversion efficiency may be obtained. In this manner, a laser beam, the wavelength of which has been converted into a shorter wavelength and which has a high intensity, can be obtained.

In general, a solid laser medium exhibits larger birefringence than the crystal of a nonlinear optical material. Therefore, even if the rate of the change in the thickness of the solid laser medium (i.e., the angle of inclination of the edge face of the solid laser medium) is comparatively small, and even if the distance of the movement of the solid laser medium is comparatively small, the phase difference $\Delta'$ can be changed significantly. Accordingly, with the sixth optical wavelength converting apparatus in accordance with the present invention, the direction of linear polarization of the fundamental wave can be set appropriately with a small amount of adjustment such that the position of the resonator mode may not shift.

Also, the sixth optical wavelength converting apparatus in accordance with the present invention need not be provided with a temperature adjusting means, which is large in size and should have a high accuracy. Additionally, with the sixth optical wavelength converting apparatus in accordance with the present invention, accurate measurement and adjustment of the length of the crystal need not be carried out. Therefore, the sixth optical wavelength converting apparatus in accordance with the present invention can be kept small in size and cheap in cost.

Further, with the sixth optical wavelength converting apparatus in accordance with the present invention, by adjusting the distance of the movement of the solid laser medium, oscillation of the solid laser medium can be effected at the position corresponding to an appropriate thickness of the solid laser medium, and the level of birefringence in the resonator can be adjusted appropriately. Therefore, the occurrence of any mode competition noise can be eliminated even if the fundamental wave is being generated in a multimode.

As will be understood from the specification, it should be noted that the term "moving a solid laser medium with respect to a pumping source" as used herein means movement of the solid laser medium relative to the pumping source, and embraces both the cases wherein the solid laser medium is moved while the pumping source is kept stationary, and cases wherein the pumping source is moved while the solid laser medium is kept stationary.

The present invention still further provides a seventh optical wavelength converting apparatus, which comprises:

i) a crystal of a nonlinear optical material, which is located in a resonator of a laser diode pumped solid laser, said crystal converting a laser beam, which has been obtained from solid laser oscillation and serves as a fundamental wave which impinges upon said crystal, into its second harmonic by effecting the type II of phase matching between said fundamental wave and its second harmonic, and ii) a wavelength selecting device, which is located in said resonator and selects the wavelength of said laser beam, having been obtained from the solid laser oscillation such that the wavelength of said laser beam may be adjusted appropriately.

With the seventh optical wavelength converting apparatus in accordance with the present invention, the wavelength of the laser beam, which has been obtained from the solid laser oscillation, is changed. Specifically, the wavelength $\lambda$ of the fundamental wave in Formula (12) changes. Also, the refractive indexes $$n^{\omega}{}_{,2} \text{ and } n^{\omega}{}_{,1}$$

change. Therefore, the value of the phase difference $\Delta$ changes, and the direction of linear polarization of the fundamental wave thereby changes. Accordingly, when the wavelength of the laser beam, which has been obtained from the solid laser oscillation, is appropriately adjusted by the wavelength selecting device, the direction of linear polarization of the fundamental wave, with respect to the crystal of the nonlinear optical material, can be set such that the maximum wavelength conversion efficiency may be obtained. In this manner, a laser beam, the wavelength of which has been converted into a shorter wavelength and which has a high intensity, can be obtained.

Also, the seventh optical wavelength converting apparatus in accordance with the present invention need not be provided with a temperature adjusting means, which is large in size and should have a high accuracy. Additionally, with the seventh optical wavelength converting apparatus in accordance with the present invention, accurate measurement and adjustment of the length of the crystal need not be carried out. Therefore, the seventh optical wavelength converting apparatus in accordance with the present invention can be kept small in size and cheap in cost.

Further, with the seventh optical wavelength converting apparatus in accordance with the present invention, by the effects of the wavelength selecting device, the solid laser oscillates in the single longitudinal mode. Therefore, no mode competition noise occurs in the laser beam, the wavelength of which has been converted into a shorter wavelength.

The present invention also provides an eighth optical wavelength converting apparatus comprising a crystal of a nonlinear optical material, which is located in a resonator of a laser diode pumped solid laser, wherein said crystal converts a laser beam, which has been obtained from solid laser oscillation and serves as a fundamental wave which impinges upon said crystal, into its second harmonic by effecting the type II of phase matching between said fundamental wave and its second harmonic, wherein at least either one of faces of said crystal, through which faces said fundamental wave passes, is convex, and a means which moves said crystal in a direction such that the length of the optical path of said fundamental wave in said crystal may change.

The length of the optical path of the fundamental wave in the crystal corresponds to the crystal length L in Formula (12). If the crystal length L changes, the phase difference $\Delta$ will change. When the phase difference $\Delta$ changes, the direction of linear polarization of the fundamental wave also changes. Therefore, by moving the crystal of the nonlinear optical material in the manner described above, the direction of linear polarization of the fundamental wave can be adjusted such that the maximum wavelength conversion efficiency may be obtained.

Also, with the eighth optical wavelength converting apparatus in accordance with the present invention, at least either one of the faces of the crystal, through which faces the fundamental wave passes, is convex. Therefore, the solid laser easily oscillates in a single mode. Accordingly, mode competition noise can be prevented from occurring, and the second harmonic free of any noise can be obtained.

Additionally, because the convex face of the crystal has lens effects, the diameter of the laser beam in the crystal of the nonlinear optical material becomes small. Therefore, the wavelength conversion efficiency can be kept high.

Further, the eighth optical wavelength converting apparatus in accordance with the present invention need not be provided with a temperature adjusting means, which is large in size and should have a high accuracy. Therefore, the eighth optical wavelength converting apparatus in accordance with the present invention can be kept small in size and cheap in cost.

BRIEF DESCRIPTION OF THE DRAWINGS

FIG. 13 is a side view showing a fifth embodiment of the optical wavelength converting apparatus in accordance with the present invention, FIG. 30 is a side view showing a seventeenth embodiment of the optical wavelength converting apparatus in accordance with the present invention, FIG. 31 is a perspective view showing the major part of the seventeenth embodiment, and FIG. 32 is a side view showing an eighteenth embodiment of the optical wavelength converting apparatus in accordance with the present invention.

DESCRIPTION OF THE PREFERRED EMBODIMENTS

The present invention will hereinbelow be described in further detail with reference to the accompanying drawings.

Figure 2:
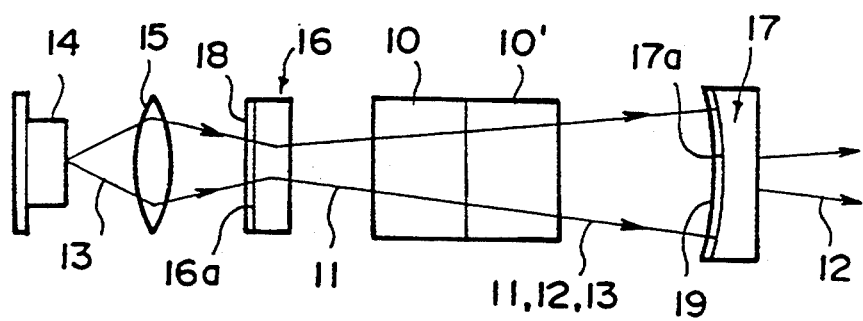
FIG. 2 is a side view showing the first embodiment.

FIG. 2 shows a first embodiment of the optical wavelength converting apparatus in accordance with the present invention.

By way of example, this embodiment is incorporated in a laser diode pumped solid laser. The laser diode pumped solid laser comprises a semiconductor laser (a phased array laser) 14, which produces a laser beam 13 serving as a pumping beam, and a condensing lens 15 for condensing the laser beam 13, which is a divergent beam. The laser diode pumped solid laser also comprises a YVO$_4$ rod 16, which is a solid laser rod added with neodymium (Nd). (The YVO$_4$ rod, which is a solid laser rod added with neodymium, will hereinafter be referred to as the Nd:YVO$_4$ rod.) The laser diode pumped solid laser further comprises a resonator 17, which is located on the side downstream from the Nd:YVO$_4$ rod 16, i.e. on the right side of the Nd:YVO$_4$ rod 16 in FIG. 2, and KTP crystals 10, 10', which are located between the Nd:YVO$_4$ rod 16 and the resonator 17. These elements 10 through 17 are mounted together with one another on a common case (not shown). The temperature of the phased array laser 14 is set at a predetermined temperature by a Peltier apparatus (not shown) and a temperature adjusting circuit (not shown).

The phased array laser 14 produces the laser beam 13 having a wavelength λ1 of 809 nm. The neodymium atoms contained in the Nd:YVO$_4$ rod 16 are stimulated by the laser beam 13, and the Nd:YVO$_4$ rod 16 produces a laser beam 11 having a wavelength λ2 of 1,064 nm.

A light input face 16a of the Nd:YVO$_4$ rod 16 is provided with a coating 18, which substantially reflects the laser beam 11 having the wavelength of 1,064 nm (with a reflectivity of at least 99.9%) and which substantially transmits the pumping laser beam 13 having the wavelength of 809 nm (with a transmittance of at least 99%). A face 17a of the resonator 17, which face is located on the side of the KTP crystals 10 and 10', takes on the form of part of a spherical surface. The face 17a of the resonator 17 is provided with a coating 19, which substantially reflects the laser beam 11 having the wavelength of 1,064 nm and the laser beam 13 having the wavelength of 809 nm and which substantially transmits a second harmonic 12 having a wavelength of 532 nm. Therefore, the laser beam 11 having the wavelength of 1,064 nm is confined between the face 16a and the face 17a, and laser oscillation is thereby caused to occur.

The laser beam 11 impinges upon the KTP crystals 10 and 10' of a nonlinear optical material, and is converted thereby into the second harmonic 12 having the wavelength, which is one half of the wavelength of the laser beam 11, i.e. is equal to 532 nm. Because the face 17a of the resonator 17 is provided with the coating 19, approximately only the second harmonic 12 is radiated out of the resonator 17.

Figure 1:
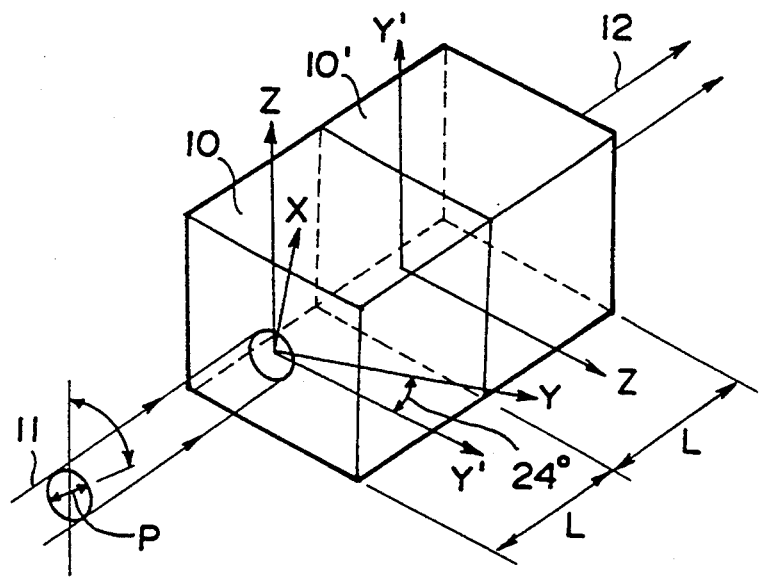
FIG. 1 is a perspective view showing the locations of two crystals of a nonlinear optical material in a first embodiment of the optical wavelength converting apparatus in accordance with the present invention.

As illustrated in detail in FIG. 1, the KTP crystal 10, which is a biaxial crystal, has been cut along the plane which has been rotated 24° from the YZ plane around the Z axis. (The KTP crystal 10' has also been cut in the same manner as the KTP crystal 10.) The KTP crystal 10 is located such that the direction of linear polarization of the laser beam 11, which direction is indicated by the double headed arrow P, may make an angle of 45° with respect to the Z axis. The KTP crystal 10' is located such that its Z axis may be shifted 90° from the Z axis of the KTP crystal 10. Also, the crystal length L of the KTP crystal 10' is equal to the crystal length L of the KTP crystal 10.

By locating the KTP crystals 10 and 10' in the manner described above with respect to the laser beam 11, the type II of phase matching between the laser beam 11, which serves as the fundamental wave, and its second harmonic 12 can be effected. Also, by locating the KTP crystal 10 and the KTP crystal 10' in the manner described above with respect to each other, the phase difference Δ and the phase difference Δ' occurring in the laser beam 11 are canceled with each other. Therefore, for reasons described above, the second harmonic 12 having the maximum output power can be obtained.

Figure 8A:
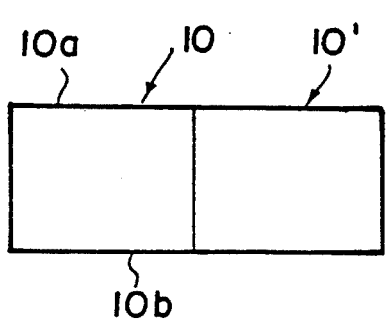
FIGS. 8A and 8B are schematic views showing an example of how to make the crystal of a nonlinear optical material, which is employed in the optical wavelength converting apparatus in accordance with the present invention.
Figure 8B:
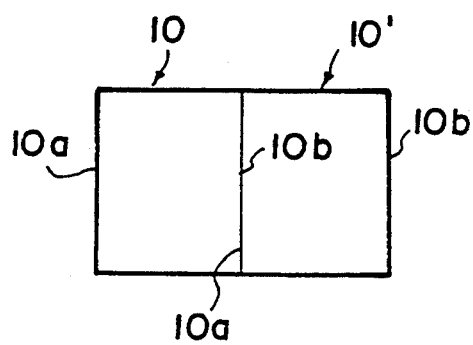

The KTP crystals 10 and 10', having the exactly equal length L can be made, for example, in the manner described below. Specifically, as illustrated in FIG. 8A, two crystals 10 and 10' are adhered to each other. Thereafter, the upper surface 10a and the lower surface 10b of the combined body are polished such that they may accurately become parallel to each other (e.g. with parallelism error falling within the range of 10 to 20 seconds). The KTP crystals 10 and 10' are then separated from each other. Thereafter, as illustrated in FIG. 8B, the KTP crystals 10 and 10' are secured to each other such that two polished surfaces may be in close contact with each other.

Figure 9A:
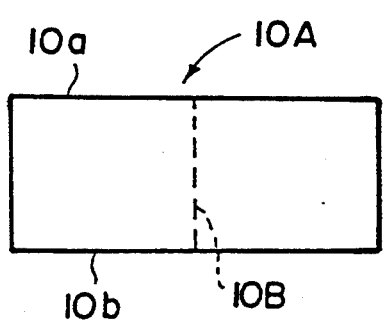
FIGS. 9A and 9B are schematic views showing a different example of how to make the crystal of a nonlinear optical material, which is employed in the optical wavelength converting apparatus in accordance with the present invention.
Figure 9B:
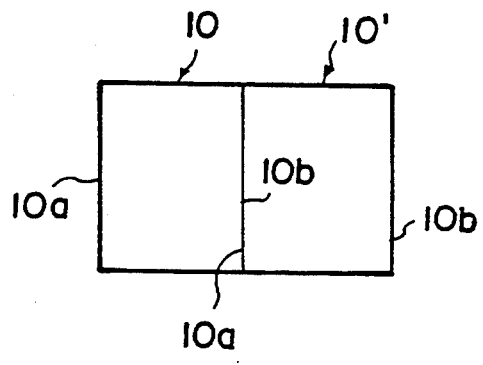

Alternatively, as illustrated in FIG. 9A, the upper surface 10a and the lower surface 10b of a single KTP crystal 10A are polished such that they may become parallel to each other. The KTP crystal 10A is then cut along a plane 10B, which passes through the polished surfaces 10a and 10b, and two KTP crystals 10 and 10' are thereby obtained. Thereafter, as illustrated in FIG. 9B, the KTP crystals 10 and 10' are secured to each other such that two polished surfaces may be in close contact with each other.

Figure 3:
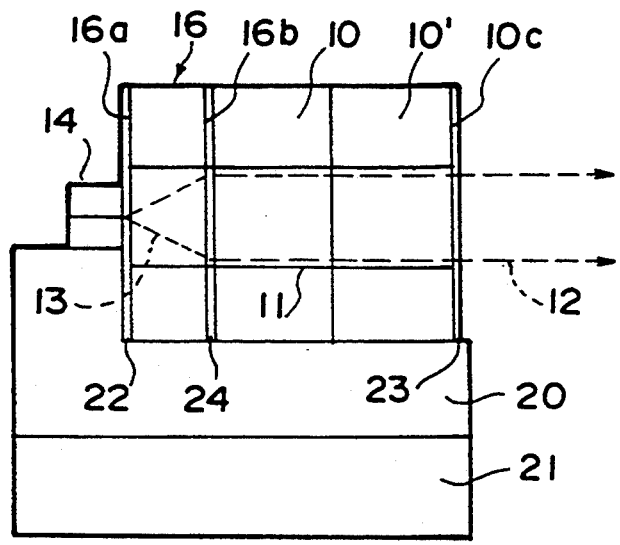
FIG. 3 is a side view showing a second embodiment of the optical wavelength converting apparatus in accordance with the present invention.
Figure 4:
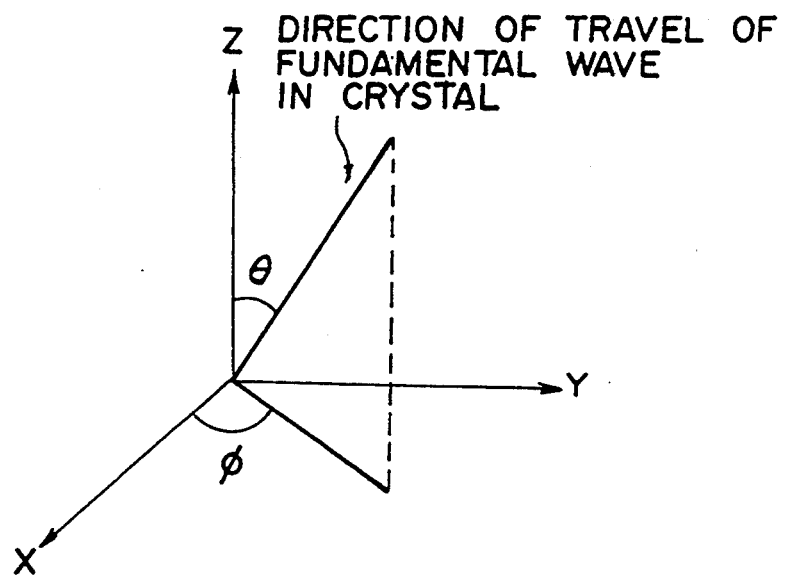
FIG. 4 is an explanatory view showing an angle $\theta$ between the direction of travel of a fundamental wave in a crystal and an optic axis Z, and an angle $\phi$ between the direction of travel of the fundamental wave and an optic axis X.

A second embodiment of the optical wavelength converting apparatus in accordance with the present invention will be described hereinbelow with reference to FIG. 3.

By way of example, this embodiment is incorporated in a laser diode pumped solid laser. In this embodiment, a Nd:YVO$_4$ rod 16 and KTP crystals 10, 10' are secured to a heat sink 20, which may be constituted of copper, or the like. The heat sink 20 is secured to a TE cooler 21, which may be constituted of a Peltier apparatus, or the like. The TE cooler 21 is operated by a driving circuit (not shown) in order to keep the temperatures of the Nd:YVO$_4$ rod 16 and the KTP crystals 10, 10' at predetermined values.

A phased array laser 14 is located such that it may be in close contact with a face 16a of the Nd:YVO₄ rod 16. Also, the phased array laser 14 is secured to the heat sink 20 such that it may be in close contact with the heat sink 20. The phased array laser 14 produces a laser beam 13 having a wavelength λ1 of 809 nm. The neodymium atoms contained in the Nd:YVO₄ rod 16 are stimulated by the laser beam 13, and the Nd:YVO₄ rod 16 produces a laser beam 11 having a wavelength λ2 of 1,064 nm.

A face 16a of the Nd:YVO₄ rod 16 is provided with a coating 22, which substantially reflects the laser beam 11 having the wavelength of 1,064 nm and which substantially transmits the pumping laser beam 13 having the wavelength of 809 nm. A face 10c of the KTP crystal 10' is provided with a coating 23, which substantially reflects the laser beam 11 having the wavelength of 1,064 nm and which substantially transmits a second harmonic 12 having a wavelength of 532 nm.

Also, the other face 16b of the Nd:YVO₄ rod 16 is provided with a coating 24, which substantially transmits the laser beam 11 and which substantially reflects the pumping laser beam 13 and the second harmonic 12.

Therefore, the laser beam 11 having the wavelength of 1,064 nm is confined between the face 16a and the face 10c, and laser oscillation is thereby caused to occur. The laser beam 11 impinges upon the KTP crystals 10 and 10', and is converted thereby into the second harmonic 12 having the wavelength λ3 of 532 nm. Because the face 10c of the KTP crystal 10' is provided with the coating 23, the second harmonic 12 is efficiently radiated out of the KTP crystal 10'.

In this embodiment, the two KTP crystals 10 and 10' have an equal length and are located such that the corresponding optic axes are deviated 90° from each other. Therefore, with the second embodiment, as in the first embodiment, the second harmonic 12 having the maximum output power can be obtained.

In the first and second embodiments described above, the fundamental wave, which has been polarized linearly, impinges upon the KTP crystals 10 and 10'. However, the optical wavelength converting apparatus in accordance with the present invention is also applicable when an unpolarized fundamental wave is converted into its second harmonic. Also, in such cases, the same effects as those described above can be obtained with the optical wavelength converting apparatus in accordance with the present invention. The optical wavelength converting apparatus in accordance with the present invention is additionally applicable when crystals of a nonlinear optical material other than KTP are employed.

The solid laser medium employed in the optical wavelength converting apparatus in accordance with the present invention is not limited to Nd:YVO₄, and may be selected from any other known media, e.g. a direct compound laser crystal, such as LNP, NAB, or NPP.

Different embodiments of the optical wavelength converting apparatus in accordance with the present invention will be described hereinbelow. In the drawings described below, similar elements are numbered with the same reference numerals with respect to FIGS. 1, 2, and 3.

Figure 11:
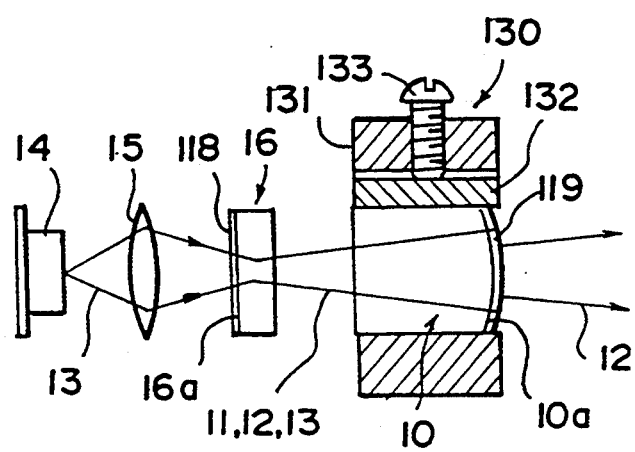
FIG. 11 is a partially cutaway side view showing the third embodiment.

FIG. 11 shows a third embodiment of the optical wavelength converting apparatus in accordance with the present invention.

By way of example, this embodiment is incorporated in a laser diode pumped solid laser. The laser diode pumped solid laser comprises the phased array laser 14, which produces the laser beam 13 serving as a pumping beam, and the condensing lens 15. The laser diode pumped solid laser also comprises the Nd:YVO₄ rod 16 and the KTP crystal 10, which is located on the side downstream from the Nd:YVO₄ rod 16, i.e. on the right side of the Nd:YVO₄ rod 16 in FIG. 11.

The light input face 16a of the Nd:YVO₄ rod 16 is provided with a coating 118, which is of the same type as the coating 18 in the embodiment of FIG. 2. The light output face 10a of the KTP crystal 10 takes on the form of part of a spherical surface. The face 10a of the KTP crystal 10 is provided with a coating 119, which is of the same type as the coating 19 in the embodiment of FIG. 2. Therefore, the laser beam 11 having the wavelength of 1,064 nm is confined between the face 16a and the face 10a, and laser oscillation is thereby caused to occur.

The laser beam 11 impinges upon the KTP crystal 10 of a nonlinear optical material, and is converted thereby into the second harmonic 12 having the wavelength, which is one half of the wavelength of the laser beam 11, i.e. is equal to 532 nm. Because the face 10a of the KTP crystal 10 is provided with the coating 119, approximately only the second harmonic 12 is radiated out of the KTP crystal 10.

Figure 10:
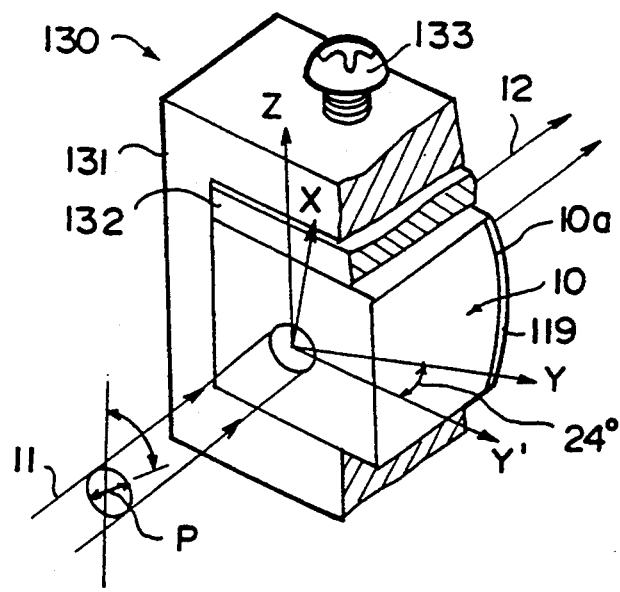
FIG. 10 is a partially cutaway perspective view showing the major part of a third embodiment of the optical wavelength converting apparatus in accordance with the present invention.

As illustrated in detail in FIG. 10, the KTP crystal 10, which is a biaxial crystal, has been cut along the plane which has been rotated 24° from the YZ plane around the Z axis. The KTP crystal 10 is located such that the direction of linear polarization of the laser beam 11, which direction is indicated by the double headed arrow P, may make an angle of 45° with respect to the Z axis. By locating the KTP crystal 10 in this manner, the type II of phase matching between the laser beam 11, which serves as the fundamental wave, and its second harmonic 12 can be effected.

The KTP crystal 10 is incorporated in a stress application means 130. The stress application means 130 comprises a square frame-like support block 131, and a pushing plate 132, which can move vertically in FIGS. 10 and 11 inside of the space defined by the support block 131. The stress application means 130 also comprises a set-screw 133, which is engaged by threads with the upper part of the support block 131 such that the leading end of the set-screw 133 may face the pushing plate 132. The KTP crystal 10 is accommodated inside of the space defined by the support block 131 such that the Z axis may extend vertically (i.e., in the direction along which the set-screw 133 moves forwardly and reversely by threads). The lower face of the KTP crystal 10 is in contact with the bottom surface of the support block 131, and the upper face of the KTP crystal 10 is in contact with the pushing plate 132.

When the set-screw 133 is tightened in this state, a stress in the Z axis direction is applied to the KTP crystal 10. As the set-screw 133 is tightened more strongly, a larger stress is applied to the KTP crystal 10. When the stress applied to the KTP crystal 10 is increased little by little to a predetermined value, the phase difference Δ, which has been caused to occur by the KTP crystal 10, becomes eliminated. Therefore, for reasons described above, the second harmonic 12, having the maximum output power, can be obtained.

The value of the stress applied to the KTP crystal 10 can thus be set at an appropriate value. Therefore, in cases where the laser beam 11, which serves as the fundamental wave, is being produced in a multimode, the mode competition noise can be prevented from occurring.

Figure 12:
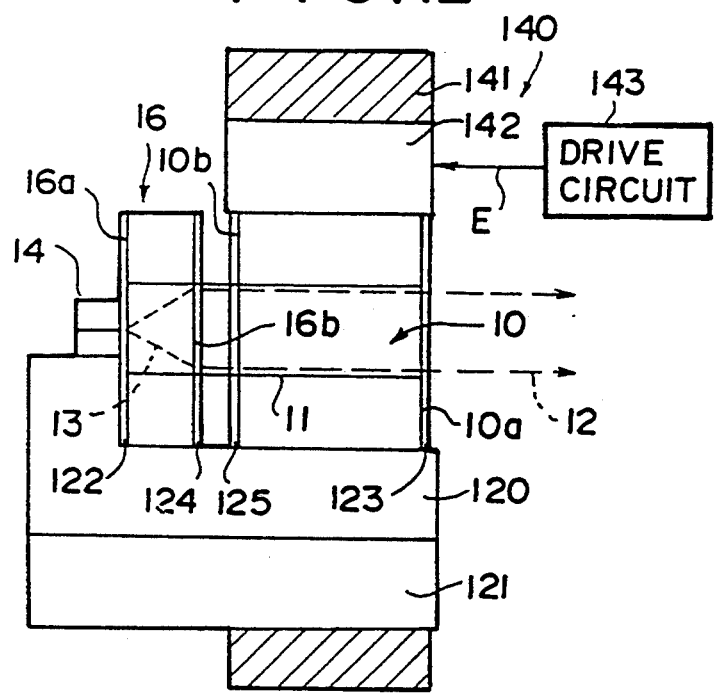
FIG. 12 is a partially cutaway side view showing a fourth embodiment of the optical wavelength converting apparatus in accordance with the present invention.

A fourth embodiment of the optical wavelength converting apparatus in accordance with the present invention will be described hereinbelow with reference to FIG. 12.

By way of example, this embodiment is incorporated in a laser diode pumped solid laser. In this embodiment, the Nd:YVO$_4$ rod 16 and the KTP crystal 10 are secured to a heat sink 120, which may be constituted of copper, or the like. The heat sink 120 is secured to a TE cooler 121, which may be constituted of a Peltier apparatus, or the like. The TE cooler 121 is operated by a driving circuit (not shown) in order to keep the temperatures of the Nd:YVO$_4$ rod 16 and the KTP crystal 10 at predetermined values.

The phased array laser 14 is located such that it may be in close contact with the face 16a of the Nd:YVO$_4$ rod 16. Also, the phased array laser 14 is secured to the heat sink 120 such that it may be in close contact with the heat sink 120. The phased array laser 14 produces the laser beam 13 having a wavelength λ of 809 nm. The neodymium atoms contained in the Nd:YVO$_4$ rod 16 are stimulated by the laser beam 13, and the Nd:YVO$_4$ rod 16 produces the laser beam 11 having a wavelength λ2 of 1,064 nm.

The face 16a of the Nd:YVO$_4$ rod 16 is provided with a coating 122, which substantially reflects the laser beam 11 having the wavelength of 1,064 nm and which substantially transmits the pumping laser beam 13 having the wavelength of 809 nm. The face 10a of the KTP crystal 10 is provided with a coating 123, which substantially reflects the laser beam 11 having the wavelength of 1,064 nm and which substantially transmits a second harmonic 12 having a wavelength of 532 nm.

Also, the other face 16b of the Nd:YVO$_4$ rod 16 is provided with a coating 124, which substantially transmits the laser beam 11 and which substantially reflects the pumping laser beam 13. The other face 10b of the KTP crystal 10 is provided with a coating 125, which substantially transmits the laser beam 11 and which substantially reflects the second harmonic 12.

Therefore, the laser beam 11 having the wavelength of 1,064 nm is confined between the face 16a and the face 10a, and laser oscillation is thereby caused to occur. The laser beam 11 impinges upon the KTP crystal 10, and is converted thereby into the second harmonic 12 having the wavelength of 532 nm. Because the face 10a of the KTP crystal 10 is provided with the coating 123, the second harmonic 12 is efficiently radiated out of the KTP crystal 10.

In this embodiment, the KTP crystal 10 is incorporated in a stress application means 140. The stress application means 140 comprises a square frame-like support block 141, and a piezo-electric device 142, which is located inside of the space defined by the support block 141. The stress application means 140 also comprises a drive circuit 143, which applies a voltage E to the piezo-electric device 142 and imparts a strain in the vertical direction in FIG. 12 to the piezo-electric device 142. The value of the voltage E applied by the drive circuit 143 can be varied such that the amount of the strain can be changed over a predetermined range.

The KTP crystal 10 is located in the same orientation as that in the third embodiment with respect to the laser beam 11, which serves as the fundamental wave. Also, the KTP crystal 10 is accommodated inside of the space defined by the support block 141 such that the Z axis may extend vertically (i.e., in the direction of the strain of the piezo-electric device 142). The lower face of the KTP crystal 10 stands facing the bottom surface of the support block 141 via the heat sink 120 and the TE cooler 121, and the upper face of the KTP crystal 10 is in contact with the piezo-electric device 142.

In this state, the voltage E is applied to the piezo-electric device 142, and the piezo-electric device 142 is strained such that its thickness (i.e., its vertical dimension) increases. As a result, a stress in the Z axis direction is applied to the KTP crystal 10. As the voltage E is set at a larger value and a larger strain occurs in the piezo-electric device 142, a larger stress is applied to the KTP crystal 10. When the stress applied to the KTP crystal 10 is increased little by little to a predetermined value, the phase difference Δ, which has been caused to occur by the KTP crystal 10, becomes eliminated. Therefore, as in the third embodiment, the second harmonic 12 having the maximum output power can be obtained.

In the third and fourth embodiments described above, the fundamental wave, which has been polarized linearly, impinges upon the KTP crystal 10. However, the optical wavelength converting apparatus in accordance with the present invention, wherein the stress application means is employed, is also applicable when an unpolarized fundamental wave is converted into its second harmonic. Also, in such cases, the same effects as those described above can be obtained with the optical wavelength converting apparatus in accordance with the present invention. The optical wavelength converting apparatus in accordance with the present invention, wherein the stress application means is employed, is additionally applicable when crystals of a nonlinear optical material other than KTP are employed.

A fifth embodiment of the optical wavelength converting apparatus in accordance with the present invention will be described hereinbelow with reference to FIG. 13.

By way of example, this embodiment is incorporated in a laser diode pumped solid laser. The laser diode pumped solid laser comprises the phased array laser 14, which produces the laser beam 13 serving as a pumping beam, and a collimator lens 215a, which collimates the divergent laser beam 13. The laser diode pumped solid laser also comprises a condensing lens 215b for condensing the laser beam 13, which has passed through the collimator lens 215a. The laser diode pumped solid laser additionally comprises the Nd:YVO$_4$ rod 16 and resonator mirrors 217 and 218, which are respectively located on the side downwards from the Nd:YVO$_4$ rod 16, i.e. on the right side of the Nd:YVO$_4$ rod 16 in FIG. 13, and on the side upwards from the Nd:YVO$_4$ rod 16. The laser diode pumped solid laser further comprises the KTP crystal 10, which is located between the Nd:YVO$_4$ rod 16 and the resonator mirror 217. These elements are mounted together on a common case (not shown).

A face 218a of the resonator mirror 218, which face stands facing the Nd:YVO$_4$ rod 16, takes on the form of part of a spherical surface and is provided with a coating 220, which is of the same type as the coating 18 in the embodiment of FIG. 2. A face 217a of the resonator mirror 217, which face stands facing the KTP crystal 10, takes on the form of part of a spherical surface and is provided with a coating 219. The coating 219 substantially reflects the laser beam 13 having the wavelength of 809 nm, transmits part of the laser beam 11 having the wavelength of 1,064 nm, and substantially transmits the second harmonic 12 having the wavelength of 532 nm. Therefore, the laser beam 11 having the wavelength of 1,064 nm is confined between the face 218a and the face 217a, and laser oscillation is thereby caused to occur.

The laser beam 11 impinges upon the KTP crystal 10 of a nonlinear optical material, and is converted thereby into the second harmonic 12 having a wavelength, which is one half of the wavelength of the laser beam 11, i.e. is equal to 532 nm. Because the face 217a of the resonator mirror 217 is provided with the coating 219, the laser beam 11 and the second harmonic 12 are radiated out of the resonator mirror 217.

Figure 5:
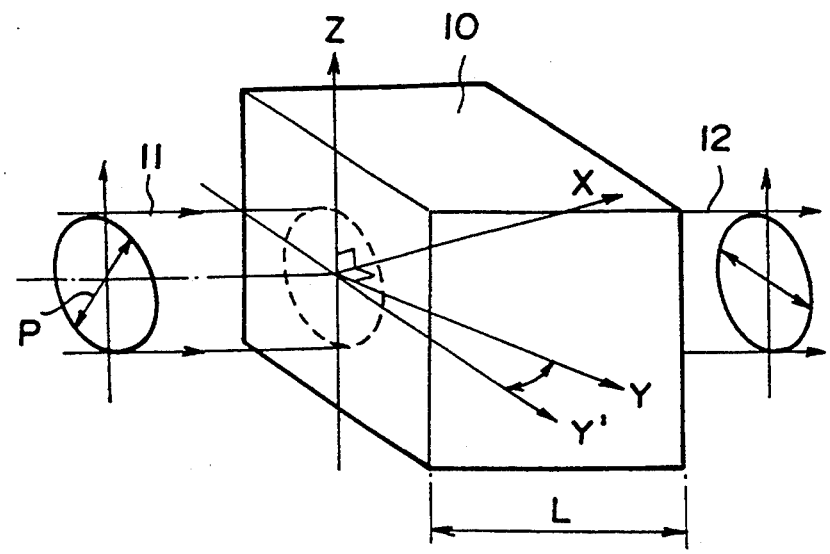
FIG. 5 is an explanatory view showing periodic fluctuations in the output power of a second harmonic.
Figure 6:
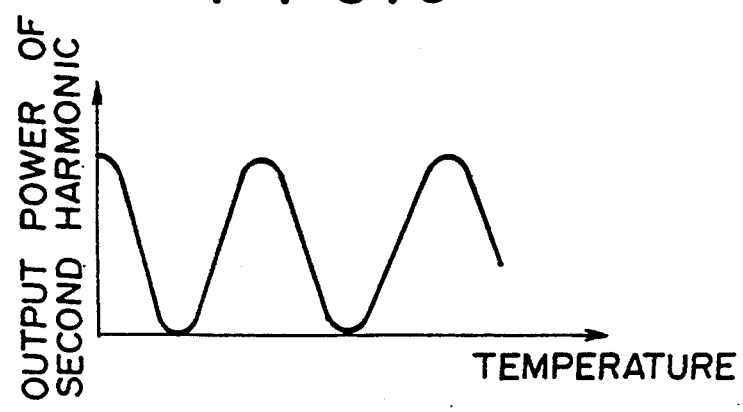
FIG. 6 is a graph showing periodic fluctuations in the output power of a second harmonic, which depend on a change in temperature.
Figure 7:
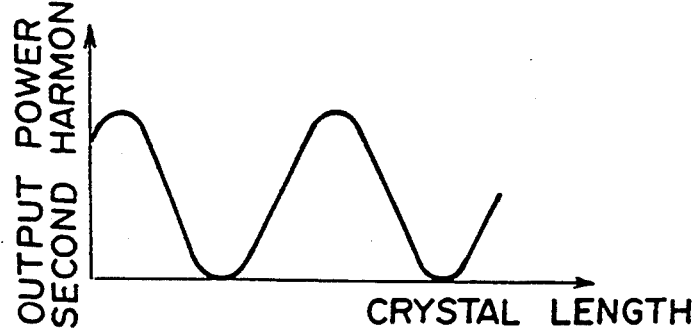
FIG. 7 is a graph showing periodic fluctuations in the output power of a second harmonic, which depend on a crystal length.

In this embodiment, the KTP crystal 10, which is a biaxial crystal, has been cut along the plane which has been rotated 24° from tile YZ plane around the Z axis (refer to FIG. 5). With this configuration, in cases where the KTP crystal 10 is located such that the direction of linear polarization of the laser beam 11, which direction is indicated by the double headed arrow P in FIG. 5, may make an angle of 45° with respect to the Z axis, a large nonlinear optical constant d24 can be utilized, and the type II of phase matching between the laser beam 11, which serves as the fundamental wave, and its second harmonic 12 can be effected. As a result, the second harmonic 12 having the maximum intensity can be obtained.

However, if the phase difference $\Delta$ is caused to occur in the laser beam 11 by the KTP crystal 10, the direction of linear polarization of the laser beam 11 will change in accordance with the value of the phase difference $\Delta$. Therefore, it will often occur that the direction of linear polarization of the laser beam 11, which direction is indicated by the double headed arrow P, does not make an angle of 45° with respect to the Z axis. How the angle of 45° is achieved between the direction of linear polarization of the laser beam 11 and the Z axis will be described hereinbelow.

The temperature of the KTP crystal 10 is adjusted by a Peltier device 230. The Peltier device 230, which serves as the means for adjusting a difference in phase, is controlled by a Peltier device controller 231. Also, a dichroic mirror 232 is located on the side downwards from the resonator mirror 217. The dichroic mirror 232 transmits the second harmonic 12 and reflects the laser beam 11, which has been slightly radiated out of the resonator mirror 217. The laser beam 11, which has been reflected by the dichroic mirror 232, passes through a filter 233 for filtering out the second harmonic 12 and then impinges upon a polarization beam splitter 234. The light component of the laser beam 11, which component has been polarized linearly in the Y' axis direction, is reflected by a film surface 234a of the polarization beam splitter 234 and detected by a first photodetector 235. The light component of the laser beam 11, which component has been polarized linearly in the direction, which is normal to the Y' axis direction, i.e. in the Z axis direction, passes through the film surface 234a of the polarization beam splitter 234 and is detected by a second photodetector 236.

The photodetectors 235 and 236 may be constituted of photodiodes, or the like. The photodetectors 235 and 236 detect the light intensities of the two linearly polarized light components of the laser beam 11, and generate signals S1 and S2. The signals S1 and S2 are fed into a differential amplifier 237. The differential amplifier 237 generates a signal S3, which has a polarity corresponding to the relationship between the values of the signals S1 and S2. The signal S3 is fed into the Peltier device controller 231. The Peltier device controller 231 controls the Peltier device 230 in accordance with the polarity of the signal S3 such that the temperature of the KTP crystal 10 may be increased or decreased. When the Peltier device 230 is operated and the temperature of the KTP crystal 10 increases or decreases, the phase difference $\Delta$ of the laser beam 11 in the KTP crystal 10 changes. As a result, the direction of linear polarization of the laser beam 11 changes. In this manner, the direction of linear polarization of the laser beam 11 is controlled such that the light intensity of the polarized light component, which is detected by the first photodetector 235, and the light intensity of the polarized light component, which is detected by the second photodetector 236, may become equal to each other. The direction of linear polarization of the laser beam 11, which has thus been controlled, makes an angle of 45° with respect to the Z axis of the KTP crystal 10. Therefore, the wavelength conversion efficiency becomes largest, and the second harmonic 12, having the largest intensity, can be obtained.

Figure 14:
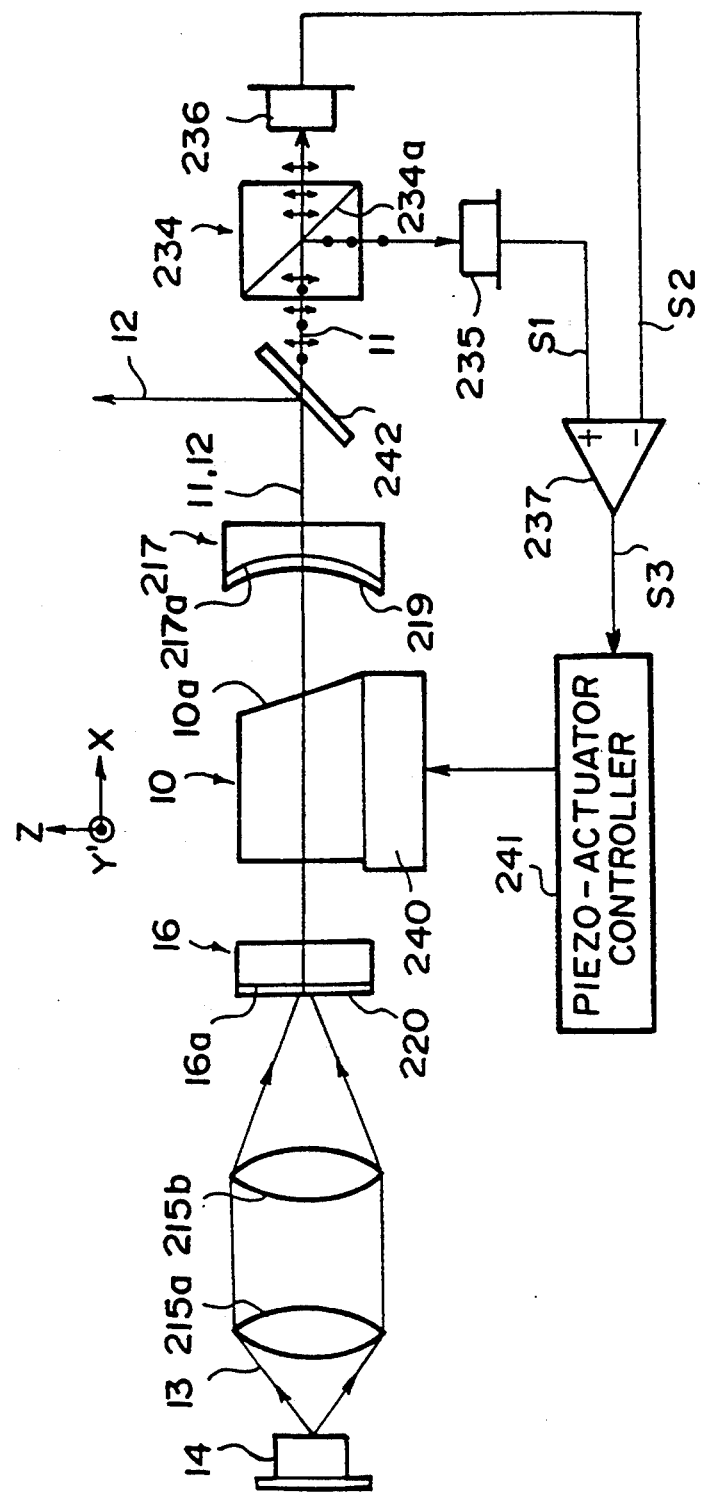
FIG. 14 is a side view showing a sixth embodiment of the optical wavelength converting apparatus in accordance with the present invention.

A sixth embodiment of the optical wavelength converting device in accordance with the present invention will be described hereinbelow with reference to FIG. 14.

In this embodiment, the light input face 16a of the Nd:YVO4 rod 16 is provided with the coating 220. A resonator is constituted of the Nd:YVO4 rod 16 and the mirror 217. Also, the light passage face 10a of the KTP crystal 10 is slant, and the KTP crystal 10 is secured to a piezo-actuator 240. The piezo-actuator 240 is controlled by a piezo-actuator controller 241 and moves the KTP crystal 10 in the vertical direction in FIG. 14.

A dichroic mirror 242 is located on the side downwards from the resonator mirror 217. The dichroic mirror 242 reflects the second harmonic 12 and transmits the laser beam 11, which has been slightly radiated out of the resonator mirror 217. The laser beam 11, which has passed through the dichroic mirror 242, impinges upon the polarization beam splitter 234. Therefore, in this embodiment, as in the fifth embodiment, the light component of the laser beam 11, which component has been polarized linearly in the Y' axis direction, is detected by the first photodetector 235. The light component of the laser beam 11, which component has been polarized linearly in the Z axis direction, is detected by the second photodetector 236.

The photodetectors 235 and 236 detect the light intensities of the two linearly polarized light components of the laser beam 11, and generate the signals S1 and S2. The signals S1 and S2 are fed into the differential amplifier 237. The differential amplifier 237 generates a signal S3, which has a polarity corresponding to the relationship between the values of the signals S1 and S2. The signal S3 is fed into the piezo-actuator controller 241. The piezo-actuator controller 241 controls the piezo-actuator 240 in accordance with the polarity of the signal S3 such that the KTP crystal 10 may be moved up or down. When the piezo-actuator 240 is operated and the KTP crystal 10 is moved up or down, the passage length of the laser beam 11 through the KTP crystal 10 changes, and the phase difference $\Delta$ of the laser beam 11 changes in accordance with the change in the passage length of the laser beam 11 through the KTP crystal 10. As a result, the direction of linear polarization of the laser beam 11 changes.

In this manner, the direction of linear polarization of the laser beam 11 is controlled such that the light intensity of the polarized light component, which is detected by the first photodetector 235, and the light intensity of the polarized light component, which is detected by the second photodetector 236, may become equal to each other. The direction of linear polarization of the laser beam 11, which has thus been controlled, makes an angle of 45° with respect to the Z axis of the KTP crystal 10. Therefore, the wavelength conversion efficiency becomes greatest, and the second harmonic 12, having the greatest intensity can be obtained.

Figure 15:
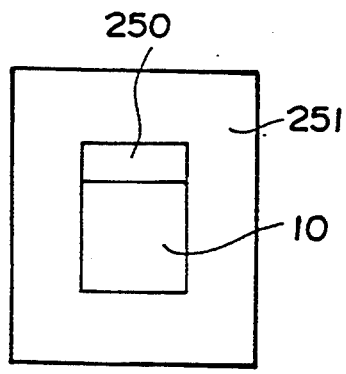
FIG. 15 is a front view showing an example of a means for adjusting a difference in phase in the optical wavelength converting apparatus in accordance with the present invention.

As the means for adjusting a difference in phase of the laser beam 11, means other than the Peltier device 230 and the piezo-actuator 240 may be employed. By way of example, the piezo-electric device 250 shown in FIG. 15 may be employed as the means for adjusting a difference in phase. The piezo-electric device 250 is accommodated together with the KTP crystal 10 in a support block 251 such that the piezo-electric device 250 may be in close contact with the KTP crystal 10. When a voltage is applied to the piezo-electric device 250, a stress is given by the piezo-electric device 250 to the KTP crystal 10. As a result, the phase difference $\Delta$ in the fundamental wave, which passes through the KTP crystal 10, changes in accordance with the value of the stress, i.e., in accordance with the value of the voltage applied to the piezo-electric device 250.

Figure 16:
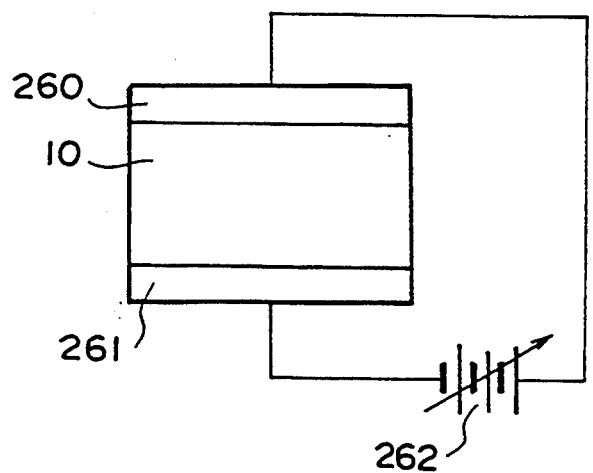
FIG. 16 is a schematic side view showing a different example of a means for adjusting a difference in phase in the optical wavelength converting apparatus in accordance with the present invention.

A different example of the means for adjusting a difference in phase is illustrated in FIG. 16. The means for adjusting a difference in phase shown in FIG. 16 comprises two electrodes 260 and 261, which stand facing each other with the KTP crystal 10 intervening therebetween, and an electric power source 262, which applies variable voltage across the electrodes 260 and 261. When a voltage is applied across the KTP crystal 10, the phase difference $\Delta$ in the fundamental wave, which passes through the KTP crystal 10, changes in accordance with the value of the voltage applied across the KTP crystal 10.

Into which two polarized light components the fundamental wave is separated, and what relationship between the light intensities of the two polarized light components is investigated are not limited to those in the fifth and sixth embodiments. For example, the fifth and sixth embodiments may be modified such that the laser beam 11 is separated into the polarized light component in the direction making an angle of +45°, with respect to the Z axis of the KTP crystal 10, and the polarized light component in the direction making an angle of −45°, with respect to the Z axis of the KTP crystal 10. In such cases, the means for adjusting a difference in phase is controlled such that one of the two polarized light components may become zero or the other polarized light component may take the maximum value.

Figure 17:
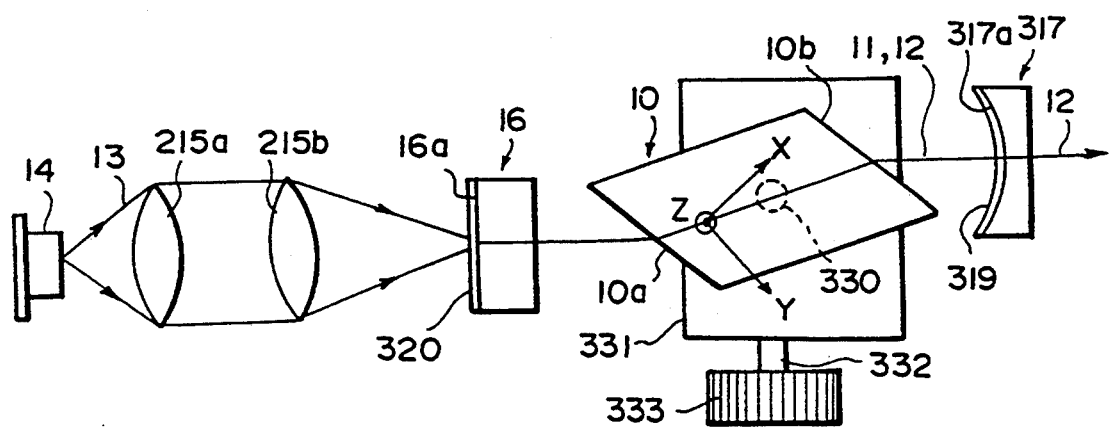
FIG. 17 is a side view showing a seventh embodiment of the optical wavelength converting apparatus in accordance with the present invention.

A seventh embodiment of the optical wavelength converting apparatus in accordance with the present invention will be described hereinbelow with reference to FIG. 17.

By way of example, this embodiment is incorporated in a laser diode pumped solid laser. The laser diode pumped solid laser comprises the phased array laser 14, which produces the laser beam 13 serving as a pumping beam, the collimator lens 215a, and the condensing lens 215b. The laser diode pumped solid laser also comprises the Nd:YVO$_4$ rod 16 and a resonator mirror 317, which is located on the side downwards from the Nd:YVO$_4$ rod 16, i.e. on the right side of the Nd:YVO$_4$ rod 16 in FIG. 17. The laser diode pumped solid laser additionally comprises the KTP crystal 10, which is located between the Nd:YVO$_4$ rod 16 and the resonator mirror 317. These elements are mounted together on a common case (not shown). The neodymium atoms contained in the Nd:YVO$_4$ rod 16 are stimulated by the laser beam 13, and the Nd:YVO$_4$ rod 16 produces the linearly polarized laser beam 11 having a wavelength $\lambda 2$ of 1,064 nm.

The light input face 16a of the Nd:YVO$_4$ rod 16 is provided with a coating 320, which is of the same type as the coating 18 in the embodiment of FIG. 2. A face 317a of the resonator mirror 317, which face stands facing the KTP crystal 10, takes on the form of part of a spherical surface and is provided with a coating 319, which is of the same type as the coating 19 in the embodiment of FIG. 2. Therefore, the laser beam 11 having a wavelength of 1,064 nm is confined between the face 16a and the face 317a, and laser oscillation is thereby caused to occur.

The laser beam 11 impinges upon the KTP crystal 10 of a nonlinear optical material, and is converted thereby into the second harmonic 12 having a wavelength, which is one half of the wavelength of the laser beam 11, i.e. is equal to 532 nm. Because the face 317a of the resonator mirror 317 is provided with the coating 319, approximately only the second harmonic 12 is radiated out of the resonator mirror 317.

Figure 18:
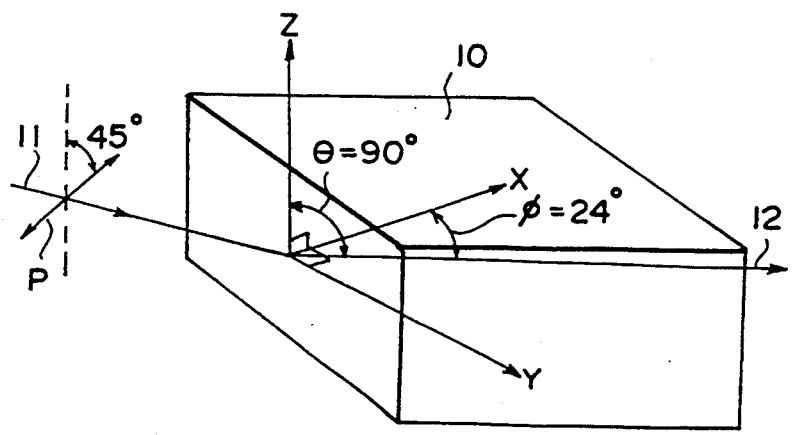
FIG. 18 is a perspective view showing the major part of the seventh embodiment.

As illustrated in detail in FIG. 18, the KTP crystal 10, which is a biaxial crystal, is located such that the X axis may make an angle of $\phi = 24°$, with respect to the direction of incidence of the laser beam 11, which serves as the fundamental wave, and the Z axis may make an angle of $\theta = 90°$, with respect to the direction of incidence of the laser beam 11. With this configuration, in cases where the KTP crystal 10 is located such that the direction of linear polarization of the laser beam 11, which direction is indicated by the double headed arrow P, may make an angle of 45°, with respect to the Z axis, a large nonlinear optical constant d24 can be utilized, and the type II of phase matching between the laser beam 11, which serves as the fundamental wave, and its second harmonic 12 can be effected. As a result, the second harmonic 12, having the maximum intensity, can be obtained.

However, if the phase difference $\Delta$ is caused to occur in the laser beam 11 by the KTP crystal 10, the direction of linear polarization of the laser beam 11 will change in accordance with the value of the phase difference $\Delta$. Therefore, it will often occur that the direction of linear polarization of the laser beam 11, which direction is indicated by the double headed arrow P, does not make an angle of 45° with respect to the Z axis. How the angle of 45° is achieved between the direction of linear polarization of the laser beam 11 and the Z axis will be described hereinbelow.

The KTP crystal 10 is secured to a rotation shaft 330, which extends parallel to the Z axis. The rotation shaft 330 is supported on a support base 331 such that the rotation shaft 330 can rotate. An adjusting knob 333, which can rotate around a rotation shaft 332, is engaged with the support base 331. The rotation shaft 332 is coupled with the rotation shaft 330 via reduction gears. Therefore, when the adjusting knob 333 is rotated, the KTP crystal 10 can be rotated around the rotation shaft 330.

When the KTP crystal 10 is rotated in the manner described above, the length L of the optical path of the laser beam 11 in the KTP crystal 10 changes. If the length L of the optical path thus changes, the phase difference Δ, which occurs in the laser beam 11 by the KTP crystal 10, changes. As a result, the direction of linear polarization of the laser beam 11 changes. Accordingly, by rotating the KTP crystal 10 little by little, the angle of 45° can be achieved between the direction of linear polarization of the laser beam 11 and the Z axis, and the second harmonic 12, having the maximum intensity, can be obtained.

In this embodiment, the KTP crystal 10 is rotated in the direction such that the angle $\phi$ may change. Alternatively, the KTP crystal 10 may be rotated in a direction such that the angle $\theta$ may change or such that both the angles $\phi$ and $\theta$ may change. The KTP crystal 10 should preferably be rotated in a direction such that both the angles $\phi$ and $\theta$ may change. In such cases, the possible range of adjustment of the phase difference Δ becomes wide.

Also, it is necessary for the amount of rotation of the KTP crystal 10 to be adjusted such that the angles $\phi$ and $\theta$ may take values in which the phase matching between the laser beam 11 and its second harmonic 12 can be effected. In cases where the standard angles are $\theta = 90°$ and $\phi = 24°$, the allowable angle ranges $\Delta\theta$ and $\Delta\phi$ for the phase matching are represented by the formulas $$L^{\frac{1}{2}} \cdot \Delta\theta = 60 \text{ mrad·cm}^{\frac{1}{2}}$$

$$L \cdot \Delta\phi = 17 \text{ mrad·cm}$$

where L is in units of cm. Therefore, the angles $\theta$ and $\phi$ should be adjusted such that the conditions $$|\Delta\theta| \leq 60/L^{2/1} \text{ (mrad)}$$

$$|\Delta\phi| \leq 17/L \text{ (mrad)}$$

may be satisfied. Specifically, in cases where the KTP crystal 10 has the standard length of L=0.5 cm, the angles $\theta$ and $\phi$ may be adjusted such that the conditions $$|\Delta\theta| \leq 85 \text{ mrad}$$

$$|\Delta\phi| \leq 34 \text{ mrad}$$

may be satisfied.

In this embodiment, the laser beam 11 impinges from the oblique direction upon the light input face 10a of the KTP crystal 10. Also, the laser beam 11 and its second harmonic 12 are radiated in an oblique direction out of the light output face 10b. Therefore, the phase difference Δ can be changed more with a smaller angle of rotation of the KTP crystal 10 than when the laser beam 11 impinges perpendicularly upon the light input face 10a of the KTP crystal 10 and the laser beam 11, and its second harmonic 12, are radiated perpendicularly out of the light output face 10b.

Figure 19:
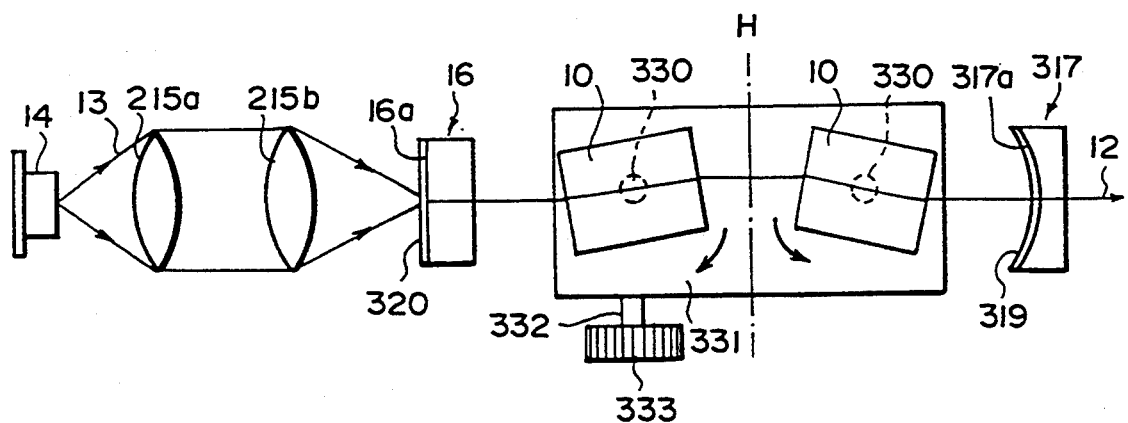
FIG. 19 is a side view showing an eighth embodiment of the optical wavelength converting apparatus in accordance with the present invention.

An eighth embodiment of the optical wavelength converting device in accordance with the present invention will be described hereinbelow with reference to FIG. 19.

This embodiment is provided with two KTP crystals 10, 10. As in the seventh embodiment, the two KTP crystals 10, 10 are rotated around rotation shafts 330, 330 by rotation mechanisms, which are coupled with the adjusting knob 333. The rotation mechanisms rotate the KTP crystals 10, 10 such that they may be symmetric with respect to a plane H, which extends in the direction normal to the optical axes of the lenses 215a and 215b, and at the middle between the rotation shafts 330, 330.

In cases where the KTP crystals 10, 10 are rotated in the manner described above, the direction of the optical path of the second harmonic 12, which has been radiated out of the right KTP crystal 10, is kept constant regardless of the angles of rotation of the KTP crystals 10, 10. Therefore, the second harmonic 12 can impinge, at a predetermined angle of incidence, upon an apparatus, which utilizes the second harmonic 12.

Figure 20:
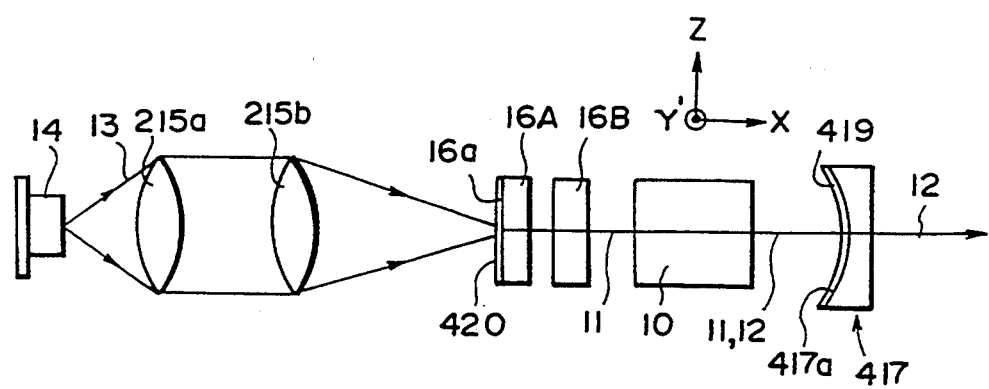
FIG. 20 is a side view showing a ninth embodiment of the optical wavelength converting apparatus in accordance with the present invention.

A ninth embodiment of the optical wavelength converting apparatus in accordance with the present invention will be described hereinbelow with reference to FIG. 20.

By way of example, this embodiment is incorporated in a laser diode pumped solid laser. The laser diode pumped solid laser comprises the phased array laser 14, which produces the laser beam 13 serving as a pumping beam, the collimator lens 215a, and the condensing lens 215b. The laser diode pumped solid laser also comprises Nd:YVO$_4$ rods 16A and 16B and a resonator mirror 417, which is located on the side downwards from the Nd:YVO$_4$ rods 16A and 16B, i.e. on the right side of the Nd:YVO$_4$ rods 16A and 16B in FIG. 20. The laser diode pumped solid laser additionally comprises the KTP crystal 10, which is located between the Nd:YVO$_4$ rods 16A, 16B and the resonator mirror 417. These elements are mounted together on a common case (not shown). The neodymium atoms contained in the Nd:YVO$_4$ rods 16A and 16B are stimulated by the laser beam 13, and the Nd:YVO$_4$ rods 16A and 16B produce the linearly polarized laser beam 11 having a wavelength of 1,064 nm.

The light input face 16a of the Nd:YVO$_4$ rod 16A is provided with a coating 420, which is of the same type as the coating 18 in the embodiment of FIG. 2. A face 417a of the resonator mirror 417, which face stands facing the KTP crystal 10, takes on the form of part of a spherical surface and is provided with a coating 419, which is of the same type as the coating 19 in the embodiment of FIG. 2. Therefore, the laser beam 11 having the wavelength of 1,064 nm is confined between the face 16a and the face 417a, and laser oscillation is thereby occurs.

Figure 21:
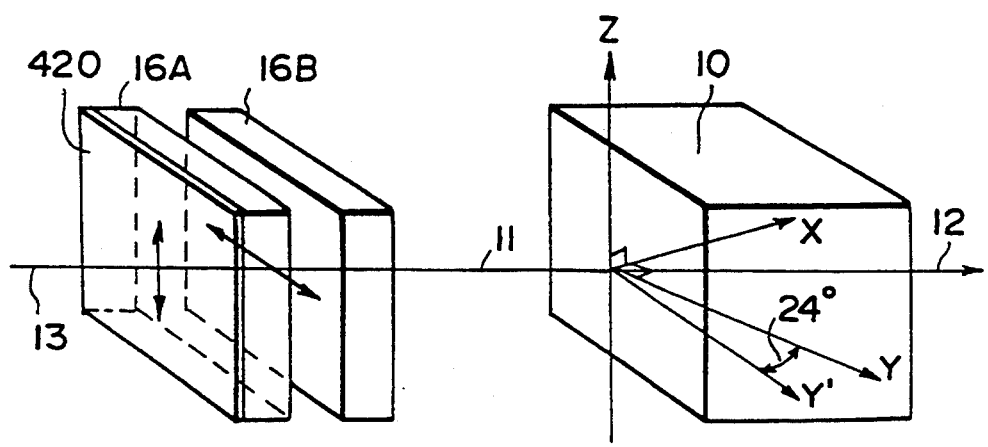
FIG. 21 is a perspective view showing the major part of the ninth embodiment.

As illustrated in detail in FIG. 21, the KTP crystal 10, which is a biaxial crystal having the nonlinear optical effects, has been cut along the plane which has been rotated 24° from the YZ plane around the Z axis. In this embodiment, a large nonlinear optical constant d24 of the KTP crystal 10 is utilized. Therefore, a fundamental wave, which has the linearly polarized light component in the Z axis direction and the linearly polarized light component in the Y' axis direction, must be caused to impinge upon the KTP crystal 10. For this purpose, the Nd:YVO$_4$ rod 16A is located in an orientation such that it may produce the light component of the laser beam 11, which component has been polarized linearly in the Z axis direction. Also, the Nd:YVO$_4$ rod 16B is located in an orientation such that it may produce the light component of the laser beam 11, which component has been polarized linearly in the Y' axis direction.

The laser beam 11, which is composed of the two linearly polarized light components produced by the Nd:YVO$_4$ rods 16A and 16B, impinges upon the KTP crystal 10, and is converted thereby into the second harmonic 12 having a wavelength, which is one half of the wavelength of the laser beam 11, i.e. is equal to 532 nm. At this time, the type II of phase matching between the laser beam 11, which serves as the fundamental wave, and its second harmonic 12 can be effected. As a result, the second harmonic 12 having the maximum intensity can be obtained. Because the face 417a of the resonator mirror 417 is provided with the coating 419, approximately only the second harmonic 12 is radiated out of the resonator mirror 417.

Of the linearly polarized light components of the laser beam 11 impinging upon the KTP crystal 10, the linearly polarized light component, which has been produced by the Nd:YVO$_4$ rod 16A, is subjected only to the refractive index represented by Formula (10) and is not subjected to the refractive index represented by Formula (11). Also, the linearly polarized light component of the laser beam 11, which component has been produced by the Nd:YVO$_4$ rod 16B, is subjected only to the refractive index represented by Formula (11) and is not subjected to the refractive index represented by Formula (10). Therefore, it does not occur that each of the two linearly polarized light components of the laser beam 11 is subjected to both the two refractive indexes. Accordingly, with this embodiment, even if the phase difference $\Delta$ represented by Formula (12) fluctuates, the direction of linear polarization of the laser beam 11 does not change, and the second harmonic 12, having a large intensity, can be obtained reliably.

Figure 22:
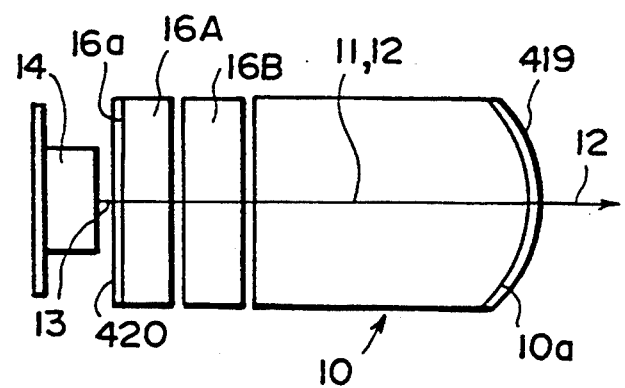
FIG. 22 is a side view showing a tenth embodiment of the optical wavelength converting apparatus in accordance with the present invention.

A tenth embodiment of the optical wavelength converting device in accordance with the present invention will be described hereinbelow with reference to FIG. 22.

In this embodiment, the coating 420 is overlaid on the light input face 16a of the Nd:YVO$_4$ rod 16A, and the coating 419 is overlaid on the right face 10a of the KTP crystal 10. A resonator is constituted of the Nd:YVO$_4$ rod 16A and the KTP crystal 10. The phased array laser 14, which serves as the pumping source, is located close to the Nd:YVO$_4$ rod 16A.

In this embodiment, as in the ninth embodiment, the Nd:YVO$_4$ rod 16A is located in an orientation such that it may produce the light component of the laser beam 11, which component has been polarized linearly in the Z axis direction. Also, the Nd:YVO$_4$ rod 16B is located in an orientation such that it may produce the light component of the laser beam 11, which component has been polarized linearly in the Y' axis direction. In this manner, with this embodiment, a large nonlinear optical constant d24 of the KTP crystal 10 can be utilized, and any change in the direction of linear polarization of the laser beam 11 can be prevented from occurring even if the phase difference $\Delta$ fluctuates.

The two solid laser media employed in combination with each other in the ninth and tenth embodiments are not limited to Nd:YVO$_4$, and may be selected from any other media, e.g. a direct compound laser crystal, such as LNP, which produce a linearly polarized laser beam.

An eleventh embodiment of the optical wavelength converting apparatus in accordance with the present invention will be described hereinbelow with reference to FIG. 23.

A laser diode pumped solid laser, which is provided with this embodiment of the optical wavelength converting device in accordance with the present invention, comprises the phased array laser 14, which produces the laser beam 13 serving as a pumping beam, the collimator lens 215a, and the condensing lens 215b. The laser diode pumped solid laser also comprises the Nd:YVO$_4$ rod 16 and a resonator mirror 517, which is located on the side downwards from the Nd:YVO$_4$ rod 16, i.e. on the right side of the Nd:YVO$_4$ rod 16 in FIG. 23. The laser diode pumped solid laser additionally comprises the KTP crystal 10, which is located between the Nd:YVO$_4$ rod 16 and the resonator mirror 517. These elements are mounted together on a common case (not shown). The neodymium atoms contained in the Nd:YVO$_4$ rod 16 are stimulated by the laser beam 13, and the Nd:YVO$_4$ rod 16 produces the laser beam 11 having a wavelength of 1,064 nm.

The light input face 16a of the Nd:YVO$_4$ rod 16 is provided with a coating 518, which is of the same type as the coating 18 in the embodiment of FIG. 2. Also, the light output face 16b of the Nd:YVO$_4$ rod 16 is provided with a non-reflective coating 509, which substantially transmits the laser beam 11 having a wavelength of 1,64 nm (with a transmittance of at least 99.9%). A face 517a of the resonator mirror 517, which face stands facing the KTP crystal 10, takes on the form of part of a spherical surface and is provided with a coating 519, which is of the same type as the coating 19 in the embodiment of FIG. 2. Therefore, the laser beam 11, having a wavelength of 1,064 nm, is confined between the face 16a and the face 517a, and laser oscillation thereby occurs. Though not shown, the face of the KTP crystal 10, which face stands facing the Nd:YVO$_4$ rod 16, is provided with a coating, which is of the same type as the non-reflective coating 509.

The laser beam 11 impinges upon the KTP crystal 10 of a nonlinear optical material, and is converted thereby into the second harmonic 12 having a wavelength, which is one half of the wavelength of the laser beam 11, i.e. is equal to 532 nm. Because the face 517a of the resonator mirror 517 is provided with the coating 519, approximately only the second harmonic 12 is radiated out of the resonator mirror 517.

Figure 23:
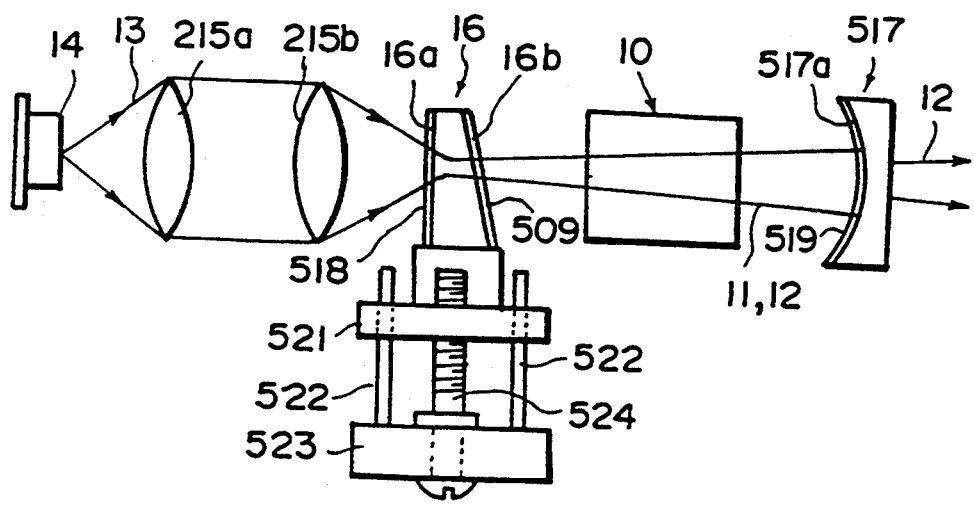
FIG. 23 is a side view showing an eleventh embodiment of the optical wavelength converting apparatus in accordance with the present invention.

The Nd:YVO$_4$ rod 16, which exhibits birefringence, is shaped in a wedge-like form such that the thickness of the Nd:YVO$_4$ rod 16 changes little by little along the direction intersecting the optical path of the laser beam 11 in the Nd:YVO$_4$ rod 16, i.e. in the vertical direction in FIG. 23. The Nd:YVO$_4$ rod 16 is supported on a support member 521. A plurality of guide rods 522, 522, ..., which extend vertically in FIG. 23, are inserted through the support member 521. The lower ends of the guide rods 522, 522, ... are secured to a fixing base 523. The support member 521 can move vertically along the guide rods 522, 522, ... A precision screw 524 is supported by the fixing base 523 such that it can move. The leading end of the precision screw 524 is engaged by threads with the support member 521. Therefore, when the precision screw 524 is rotated, the support member 521 is moved thereby in the vertical direction. As a result, the Nd:YVO$_4$ rod 16 is moved vertically.

Figure 24:
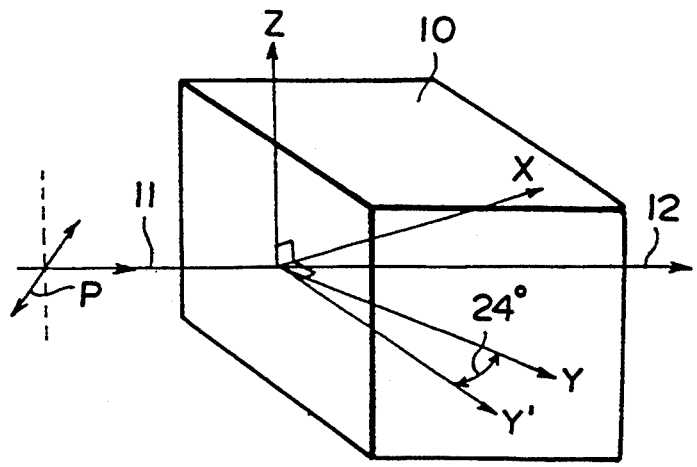
FIG. 24 is a schematic perspective view showing the major part of the eleventh embodiment.

As illustrated in detail in FIG. 24, the KTP crystal 10, which is a biaxial crystal, has been cut along the plane which has been rotated 24° from the YZ plane around the Z axis. With this configuration, in cases where the KTP crystal 10 is located such that the direction of linear polarization of the laser beam 11, which direction is indicated by the double headed arrow P, may make an angle of 45° with respect to the Z axis, a large nonlinear optical constant d24 can be utilized, and the type II of phase matching between the laser beam 11, which serves as the fundamental wave, and its second harmonic 12 can be effected. As a result, the second harmonic 12, having the maximum intensity, can be obtained.

However, if the phase difference Δ is caused to occur in the laser beam 11 by the KTP crystal 10, the direction of linear polarization of the laser beam 11 will change in accordance with the value of the phase difference Δ. Therefore, it will often occur that the direction of linear polarization of the laser beam 11, which direction is indicated by the double headed arrow P, does not make an angle of 45° with respect to the Z axis. With this embodiment, the precision screw 524 is rotated clockwise or counter-clockwise, and the Nd:YVO$_4$ rod 16 is thereby moved little by little in the vertical direction. As a result, the length of the optical path of the laser beam 11 in the Nd:YVO$_4$ rod 16 changes, and the phase difference Δ' described above changes. Therefore, the direction of linear polarization of the laser beam 11 changes. By adjusting the direction of linear polarization of the laser beam 11 in this manner, the angle of the direction of linear polarization of the laser beam 11, with respect to the Z, axis can be set at 45°. In this state, the second harmonic 12, having the maximum intensity, can be obtained.

The amount of birefringence of Nd:YVO$_4$ is $n_e - n_o = 0.2079$, which is markedly larger than the amount of birefringence of KTP, $n_Z - n_Y = 0.0853$. Therefore, in this embodiment, the inclination of the face 16b of the Nd:YVO$_4$ rod 16 may be gentler, and the distance of the movement of the Nd:YVO$_4$ rod 16 may be smaller than when the face of the KTP crystal 10 is formed as a slant surface and the KTP crystal 10 is moved. Accordingly, with this embodiment, the direction of linear polarization of the laser beam 11 can be set appropriately with a small amount of adjustment such that the position of the resonator mode may not shift.

Figure 25:
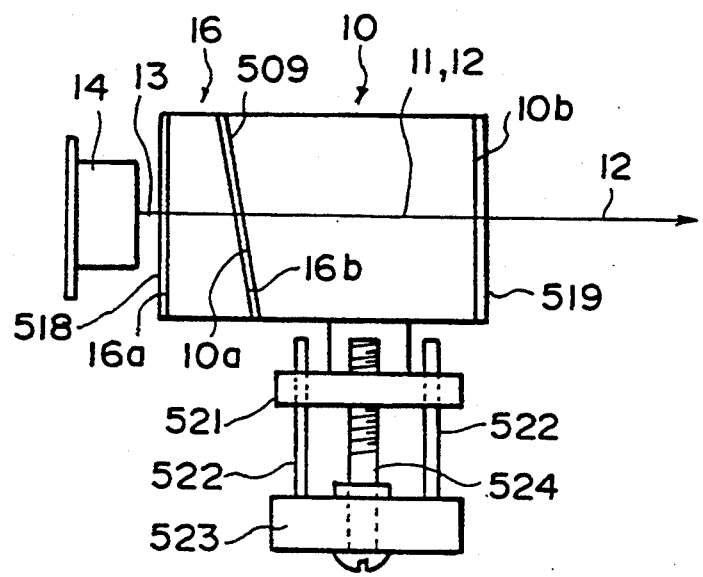
FIG. 25 is a side view showing a twelfth embodiment of the optical wavelength converting apparatus in accordance with the present invention.

A twelfth embodiment of the optical wavelength converting device in accordance with the present invention will be described hereinbelow with reference to FIG. 25.

In the twelfth embodiment, the phased array laser 14 is located close to the Nd:YVO$_4$ rod 16. The laser beam 13, which has been produced by the phased array laser 14, directly impinges upon the Nd:YVO$_4$ rod 16. The coating 519, which is of the same type as the coating 519 in the embodiment of FIG. 23, is overlaid on the right face 10b of the KTP crystal 10. A resonator is constituted of the KTP crystal 10 and the Nd:YVO$_4$ rod 16. The light input face 10a of the KTP crystal 10 is cut obliquely, and the wedge-like Nd:YVO$_4$ rod 16 is adhered to the face 10a. The KTP crystal 10 is supported on the support member 521, which is of the same type as the support member 521 in the embodiment of FIG. 23. When the precision screw 524 is rotated, the KTP crystal 10 is moved together with the Nd:YVO$_4$ rod 16 in the vertical direction in FIG. 25. With this embodiment, by vertically moving the Nd:YVO$_4$ rod 16, the direction of linear polarization of the laser beam 11 can be adjusted.

Figure 26:
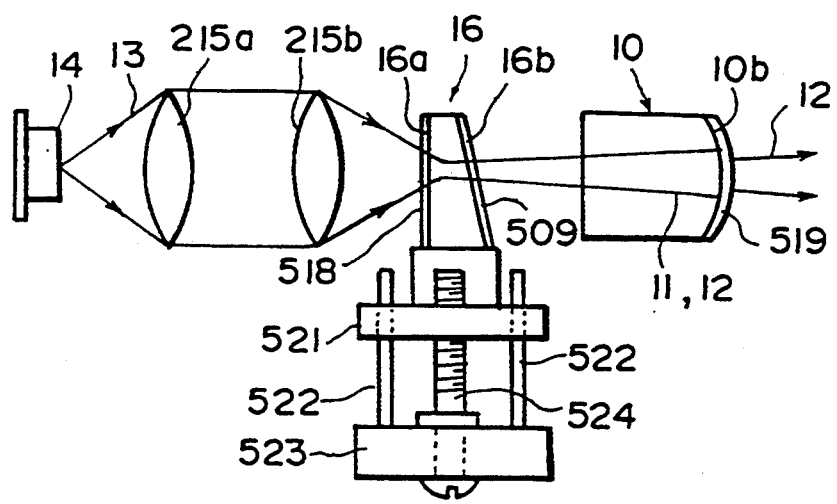
FIG. 26 is a side view showing a thirteenth embodiment of the optical wavelength converting apparatus in accordance with the present invention.

A thirteenth embodiment of the optical wavelength converting device in accordance with the present invention will be described hereinbelow with reference to FIG. 26.

In the thirteenth embodiment, the structure of the resonator on the second harmonic radiating side differs from that in the embodiment of FIG. 23. Specifically, in this embodiment, the right face 10b of the KTP crystal 10 takes on the form of part of a spherical surface and is provided with the coating 519, which is of the same type as the coating 519 in the embodiment of FIG. 23. With the thirteenth embodiment, the number of parts can be reduced by one as compared with the embodiment of FIG. 23. Therefore, the thirteenth embodiment is advantageous in keeping the optical wavelength converting device small in size, light in weight, and cheap in cost.

In the eleventh, twelfth, and thirteenth embodiments described above, the phased array laser 14, which serves as the pumping source, is kept stationary, and the Nd:YVO$_4$ rod 16 is moved. Alternatively, the Nd:YVO$_4$ rod 16 may be kept stationary, and the phased array laser 14 may be moved (together with the lenses 215a and 215b in the embodiments of FIGS. 23 and 26).

A fourteenth embodiment of the optical wavelength converting apparatus in accordance with the present invention will be described hereinbelow with reference to FIG. 24.

A laser diode pumped solid laser, which is provided with this embodiment of the optical wavelength converting device in accordance with the present invention, comprises the phased array laser 14, which produces the laser beam 13 serving as a pumping beam, the collimator lens 215a, and the condensing lens 215b. The laser diode pumped solid laser also comprises the Nd:YVO$_4$ rod 16 and a resonator mirror 617, which is located on the side downwards from the Nd:YVO$_4$ rod 16, i.e. on the right side of the Nd:YVO$_4$ rod 16 in FIG. 27. The laser diode pumped solid laser additionally comprises the KTP crystal 10, which is located between the Nd:YVO$_4$ rod 16 and the resonator mirror 617. The laser diode pumped solid laser further comprises an etalon plate 620, which is located between the Nd:YVO$_4$ rod 16 and the KTP crystal 10. These elements are mounted together on a common case (not shown). The neodymium atoms contained in the Nd:YVO$_4$ rod 16 are stimulated by the laser beam 13, and the Nd:YVO$_4$ rod 16 produces the laser beam 11 having a fundamental wavelength of 1,064 nm.

The light input face 16a of the Nd:YVO$_4$ rod 16 is provided with a coating 618, which is of the same type as the coating 18 in the embodiment of FIG. 2. Also, the light output face 16b of the Nd:YVO$_4$ rod 16 is provided with a non-reflective coating 609, which substantially transmits the laser beam 11 having a wavelength of 1,64 nm (with a transmittance of at least 99.9%). A face 617a of the resonator mirror 617, which face stands facing the KTP crystal 10, takes on the form of part of a spherical surface and is provided with a coating 619, which is of the same type as the coating 19 in the embodiment of FIG. 2. Therefore, the laser beam 11 having a wavelength of 1,064 nm is confined between the face 16a and the face 617a, and laser oscillation thereby occurs. Both faces of the etalon plate 620 are not provided with a non-reflective coating. Though not shown, the face of the KTP crystal 10, which face stands facing the etalon plate 620, is provided with a coating, which is of the same type as the non-reflective coating 609.

The laser beam 11 impinges upon the KTP crystal 10 of a nonlinear optical material, and is converted thereby into the second harmonic 12 having a wavelength, which is one half of the wavelength of the laser beam 11, i.e. is equal to 532 nm. Because the face 617a of the resonator mirror 617 is provided with the coating 619, approximately only the second harmonic 12 is radiated out of the resonator mirror 617.

Figure 27:
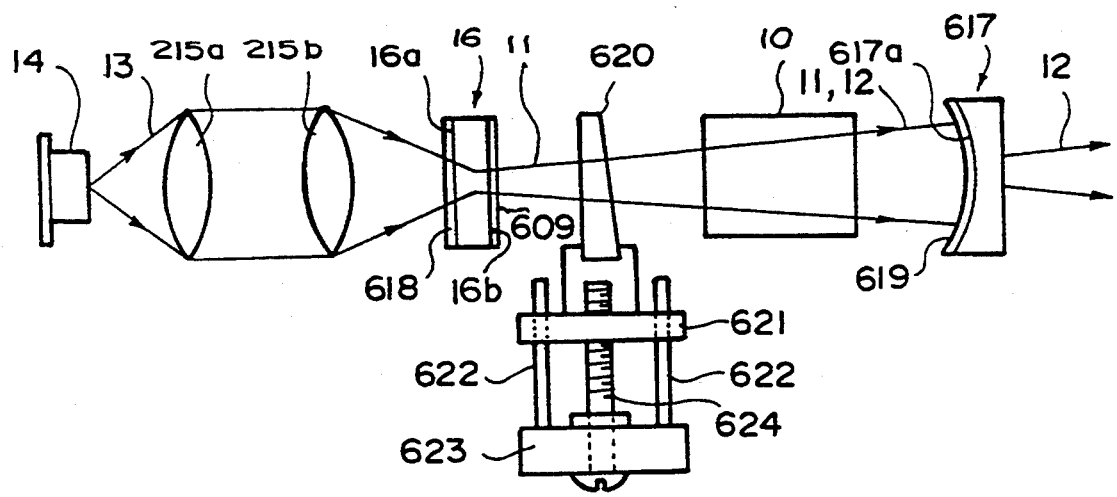
FIG. 27 is a side view showing a fourteenth embodiment of the optical wavelength converting apparatus in accordance with the present invention.

The etalon plate 620, which serves as a wavelength selecting device, is shaped in a wedge-like form. The etalon plate 620 is supported on a support member 621. A plurality of guide rods 622, 622, ..., which extend vertically in FIG. 27, are inserted through the support member 621. The lower ends of the guide rods 622, 622, ... are secured to a fixing base 623. The support member 621 can move vertically along the guide rods 622, 622, ... A precision screw 624 is supported by the fixing base 623 such that it can move. The leading end of the precision screw 624 is engaged by threads with the support member 621. Therefore, when the precision screw 624 is rotated, the support member 621 is moved thereby in the vertical direction. As a result, the etalon plate 620 is moved vertically. As the etalon plate 620 is inserted into the optical path of the laser beam 11, the wavelength of the laser beam 11 is selectively set at a predetermined value in accordance with the thickness of the etalon plate 620.

The KTP crystal 10, which is a biaxial crystal, has been cut along the plane which has been rotated 24° from the YZ plane around the Z axis (refer to FIG. 5). With this configuration, in cases where the KTP crystal 10 is located such that the direction of linear polarization of the laser beam 11, which direction is indicated by the double headed arrow P, may make an angle of 45° with respect to the Z axis, a large nonlinear optical constant d24 can be utilized, and the type II of phase matching between the laser beam 11, which serves as the fundamental wave, and its second harmonic 12 can be effected. As a result, the second harmonic 12 having the maximum intensity can be obtained.

However, if the phase difference $\Delta$ is caused to occur in the laser beam 11 by the KTP crystal 10, the direction of linear polarization of the laser beam 11 will change in accordance with the value of the phase difference $\Delta$. Therefore, it will often occur that the direction of linear polarization of the laser beam 11, which direction is indicated by the double headed arrow P, does not make an angle of 45° with respect to the Z axis. With this embodiment, the precision screw 624 is rotated clockwise or counter-clockwise, and the etalon plate 620 is thereby moved little by little in the vertical direction. As a result, the length of the optical path of the laser beam 11 in the etalon plate 620 changes, and the selected value of the wavelength changes little by little. When the wavelength of the laser beam 11 changes, the phase difference $\Delta$ described above changes. Therefore, the direction of linear polarization of the laser beam 11 changes. By adjusting the direction of linear polarization of the laser beam 11 in this manner, the angle of the direction of linear polarization of the laser beam 11, with respect to the Z axis, can be set at 45°. In this state, the second harmonic 12, having the maximum intensity, can be obtained. The wedge-like etalon plate 620 may be formed such that one light passage face may make an angle of, for example, approximately 1' with respect to the other light passage face.

In cases where the etalon plate 620 is employed, the laser diode pumped solid laser oscillates in a single longitudinal mode. Therefore, no longitudinal mode competition occurs in the laser diode pumped solid laser. Accordingly, no noise due to longitudinal mode competition occurs.

Figure 28:
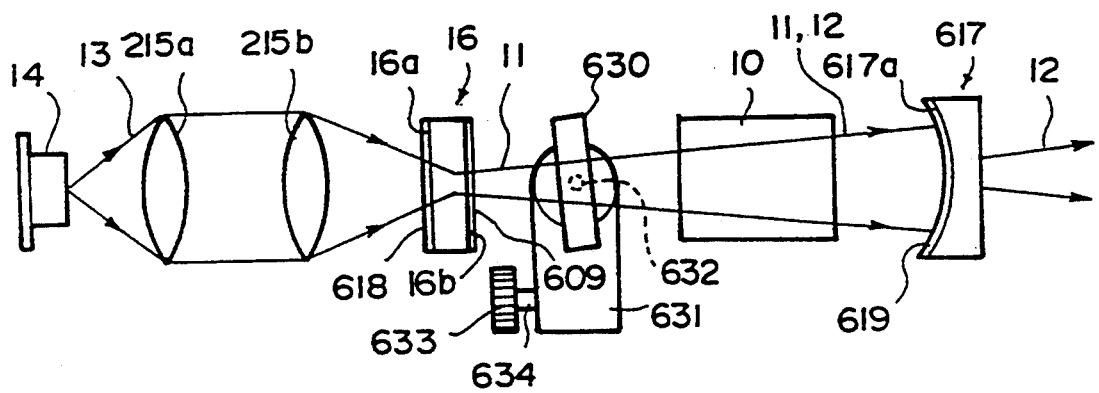
FIG. 28 is a side view showing a fifteenth embodiment of the optical wavelength converting apparatus in accordance with the present invention.

A fifteenth embodiment of the optical wavelength converting device in accordance with the present invention will be described hereinbelow with reference to FIG. 28.

In the fifteenth embodiment, two light passage faces of an etalon plate 630 are formed as parallel flat surfaces. The etalon plate 630 is supported on a support member 631 such that it can rotate around a rotation shaft 632. An adjusting knob 633 is engaged with the support member 631 such that the adjusting knob 633 can rotate around a rotation shaft 634. The rotation shaft 634 is coupled with the rotation shaft 632 via reduction gears (not shown). Therefore, when the adjusting knob 633 is rotated, the etalon plate 630 rotates around the rotation shaft 632. When the etalon plate 630 thus rotates, the length of the passage of the laser beam 11 through the etalon plate 630 changes. Accordingly, in the fifteenth embodiment, as in the fourteenth embodiment, the direction of linear polarization of the laser beam 11 can be adjusted.

Figure 29:
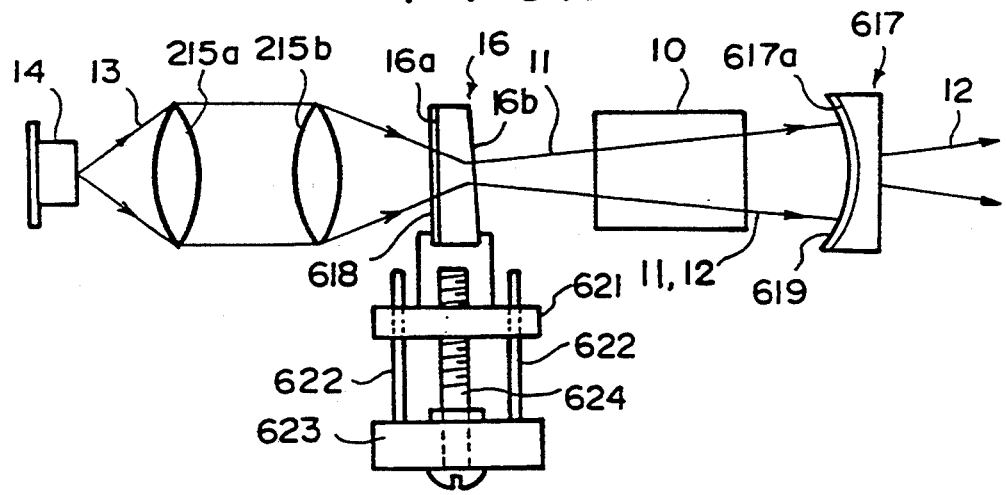
FIG. 29 is a side view showing a sixteenth embodiment of the optical wavelength converting apparatus in accordance with the present invention.

A sixteenth embodiment of the optical wavelength converting device in accordance with the present invention will be described hereinbelow with reference to FIG. 29.

In the sixteenth embodiment, the Nd:YVO$_4$ rod 16 is shaped in a wedge-like form. The light output face 16b of the Nd:YVO$_4$ rod 16 is not provided with the non-reflective coating 609 (shown in FIGS. 27 and 28). With this Nd:YVO$_4$ rod 16, part (e.g. approximately 20%) of the laser beam 11 is reflected from the light output face 16b towards the light input face 16a, and a standing wave thus occurs. Therefore, the Nd:YVO$_4$ rod 16 also serves as a wavelength selecting device, with which the selected wavelength can be adjusted. The Nd:YVO$_4$ rod 16 is supported on the support member 621, which is of the same type as the support member 621 in the embodiment of FIG. 27. When the precision screw 624 is rotated, the Nd:YVO$_4$ rod 16 can be moved vertically in FIG. 29. With this embodiment, by moving the Nd:YVO$_4$ rod 16 up and down, the wavelength of the laser beam 11 can be changed, and the direction of linear polarization of the laser beam 11 can be adjusted.

A seventeenth embodiment of the optical wavelength converting apparatus in accordance with the present invention will be described hereinbelow with reference to FIG. 30.

A laser diode pumped solid laser, which is provided with this embodiment of the optical wavelength converting device in accordance with the present invention, comprises the phased array laser 14, which produces the laser beam 13 serving as a pumping beam, the collimator lens 215a, and the condensing lens 215b. The laser diode pumped solid laser also comprises the Nd:YVO$_4$ rod 16 and the KTP crystal 10, which is located on the side downwards from the Nd:YVO$_4$ rod 16, i.e. on the right side of the Nd:YVO$_4$ rod 16 in FIG. 30. These elements are mounted together on a common case (not shown). The neodymium atoms contained in the Nd:YVO$_4$ rod 16 are stimulated by the laser beam 13, and the Nd:YVO$_4$ rod 16 produces the laser beam 11 having a wavelength of 1,064 nm.

The light input face 16a of the Nd:YVO$_4$ rod 16 is provided with a coating 718, which is of the same type as the coating 18 in the embodiment of FIG. 2. The right face 10a of the KTP crystal 10 is provided with a coating 719, which is of the same type as the coating 19 in the embodiment of FIG. 2. Also, the left face 10b of the KTP crystal 10 takes on the form of part of a convex spherical surface and is provided with a coating 720, which substantially transmits the laser beam 11. Therefore, the laser beam 11 having a wavelength of 1,064 nm is confined between the face 16a and the face 10a, and laser oscillation thereby occurs.

The laser beam 11 impinges upon the KTP crystal 10 of a nonlinear optical material, and is converted thereby into the second harmonic 12 having a wavelength, which is one half of the wavelength of the laser beam 11, i.e. is equal to 532 nm. Because the face 10a of the KTP crystal 10 is provided with the coating 719, approximately only the second harmonic 12 is radiated out of the KTP crystal 10.

The KTP crystal 10 is supported on a support member 721. A plurality of guide rods 722,722, . . . , which extend vertically in FIG. 30, are inserted through the support member 721. The lower ends of the guide rods 722,722, . . . are secured to a fixing base 723. The support member 721 can move vertically along the guide rods 722, 722, . . . A precision screw 724 is supported by the fixing base 723 such that it can move. The leading end of the precision screw 724 is engaged by threads with the support member 721. Therefore, when the precision screw 724 is rotated, the support member 721 is moved thereby in the vertical direction. As a result, the KTP crystal 10 is moved vertically.

As illustrated in detail in FIG. 31, the KTP crystal 10, which is a biaxial crystal, is located such that the laser beam 11 may impinge perpendicularly upon the plane, which has been rotated 24° from the YZ plane around the Z axis. With this configuration, in cases where the KTP crystal 10 is located such that the direction of linear polarization of the laser beam 11, which direction is indicated by the double headed arrow P, may make an angle of 45° with respect to the Z axis, a large nonlinear optical constant d24 can be utilized, and the type II of phase matching between the laser beam 11, which serves as the fundamental wave, and its second harmonic 12 can be effected. As a result, the second harmonic 12 having the maximum intensity can be obtained.

However, if the phase difference Δ is caused to occur in the laser beam 11 by the KTP crystal 10, the direction of linear polarization of the laser beam 11 will change in accordance with the value of the phase difference Δ. Therefore, it will often occur that the direction of linear polarization of the laser beam 11, which direction is indicated by the double headed arrow P, does not make an angle of 45° with respect to the Z axis. With this embodiment, the precision screw 724 is rotated clockwise or counter-clockwise, and the KTP crystal 10 is thereby moved little by little in the vertical direction. As a result, the length L of the optical path of the laser beam 11 in the KTP crystal 10 changes little by little. When the length L of the optical path of the laser beam 11 in the KTP crystal 10 changes, the phase difference Δ described above changes. Therefore, the direction of linear polarization of the laser beam 11 changes. By adjusting the direction of linear polarization of the laser beam 11 in this manner, the angle of the direction of linear polarization of the laser beam 11 with respect to the Z axis can be set at 45°. In this state, the second harmonic 12 having the maximum intensity can be obtained.

Also, in this embodiment, the face 10b of the KTP crystal 10 takes on the form of part of a convex spherical surface. Therefore, the laser beam 11 is easily generated in a single longitudinal mode. Accordingly, mode competition noise can be prevented from occurring, and the second harmonic 12 free of any noise can be obtained. Additionally, because the face 10b of the KTP crystal 10 has lens effects, the diameter of the laser beam 11 in the KTP crystal 10 becomes small. Therefore, the wavelength conversion efficiency can be kept high.

An eighteenth embodiment of the optical wavelength converting device in accordance with the present invention will be described hereinbelow with reference to FIG. 32.

In the eighteenth embodiment, the KTP crystal 10 is supported on a support member 731 such that the KTP crystal 10 can rotate around a rotation shaft 732, which is shifted from the center of the curvature of the face 10b. An adjusting knob 733 is engaged with the support member 731 such that the adjusting knob 733 can rotate around a rotation shaft 734. The rotation shaft 734 is coupled with the rotation shaft 732 via reduction gears. Therefore, when the adjusting knob is rotated, the KTP crystal 10 rotates around the rotation shaft 732. When the KTP crystal 10 thus rotates, the length of the optical path of the laser beam 11 in the KTP crystal 10 changes. Accordingly, with this embodiment, as in the seventeen embodiment, the direction of linear polarization of the laser beam 11 can be adjusted.

What is claimed is:

1. An optical wavelength converting apparatus in which a laser beam serving as a fundamental wave and having been obtained by pumping a solid laser medium impinges upon a crystal of a nonlinear optical material, the type II of phase matching between the fundamental wave and its second harmonic is effected, and the second harmonic of the fundamental wave is thereby radiated out of the optical wavelength converting apparatus, wherein a solid laser medium, which exhibits birefringence and the thickness of which changes gradually along the direction that intersects the optical path of said fundamental wave in the solid laser medium, is employed as said solid laser medium, and a means which moves said solid laser medium with respect to a pumping source along said direction that intersects the optical path of said fundamental wave.

2. An apparatus as defined in claim 1 wherein said crystal and said solid laser medium are located such that they may be in close contact with each other.

3. An apparatus as defined in claim 1 wherein said pumping source for pumping said solid laser medium is a laser diode.

4. An apparatus as defined in claim 1 wherein said crystal is located inside of a resonator of a solid laser.

5. An apparatus as defined in claim 1 wherein $YVO_4$, which has been added with Nd, is employed as said solid laser medium.

6. An apparatus as defined in claim 1 wherein said crystal of said nonlinear optical material is a KTP crystal.

7. An apparatus as defined in claim 6 wherein said KTP crystal has been cut along a plane, which has been rotated 24° from its YZ plane around the Z axis, and is located in an orientation such that said fundamental wave impinges perpendicularly upon the cut surface and such that the direction of linear polarization of said fundamental wave may make an angle of 45°, with respect to the Z axis.

* * * * *